United States Patent [19]

Nakayama

[11] Patent Number: 5,517,239
[45] Date of Patent: May 14, 1996

[54] HORIZONTAL LINE INTERPOLATION CIRCUIT AND IMAGE PICKUP APPARATUS INCLUDING IT

[75] Inventor: Masaaki Nakayama, Hirakata, Japan

[73] Assignee: Matsushita Electric Industrial Co., Ltd., Osaka, Japan

[21] Appl. No.: 104,913

[22] Filed: Aug. 12, 1993

Related U.S. Application Data

[62] Division of Ser. No. 765,036, Sep. 24, 1991, Pat. No. 5,268,758.

[30] Foreign Application Priority Data

Sep. 26, 1990 [JP] Japan .................. 2-258002
Sep. 26, 1990 [JP] Japan .................. 2-258003
Oct. 22, 1990 [JP] Japan .................. 2-285004
Mar. 28, 1991 [JP] Japan .................. 3-064476

[51] Int. Cl.$^6$ .................. H04N 5/262; H04N 5/213
[52] U.S. Cl. .................. 348/222; 348/240; 348/241; 348/571; 348/607; 348/678; 348/255; 348/704
[58] Field of Search .................. 358/41, 209, 167, 358/36, 166, 37, 140, 11, 180, 160, 183, 22, 22 PIP, 22 C, 22 CK, 21 R, 177; 348/222, 240, 241, 607, 608, 612, 624, 470, 704, 571, 578, 708, 683, 255, 678; H04N 3/223, 5/262, 5/213, 5/335

[56] References Cited

U.S. PATENT DOCUMENTS

| 4,163,249 | 7/1979 | Michael | 358/21 R |
| 4,962,419 | 10/1990 | Hibbard | 358/37 |
| 4,984,070 | 1/1991 | Tanaka | 358/36 |
| 5,021,870 | 6/1991 | Motoe | 358/11 |
| 5,134,479 | 7/1992 | Ohishi | 358/140 |
| 5,170,248 | 12/1992 | Min | 358/37 |

FOREIGN PATENT DOCUMENTS

0136770A1 4/1985 European Pat. Off. .
0225029A2 6/1987 European Pat. Off. .
0367418A2 5/1990 European Pat. Off. .

Primary Examiner—James J. Groody
Assistant Examiner—Sherrie Hsia
Attorney, Agent, or Firm—Wenderoth, Lind & Ponack

[57] ABSTRACT

An image pickup apparatus includes an image sensor for simultaneously reading signals of adjoining two horizontal pixel rows by one-time horizontal scan; an electronic zoom circuit for enlargement-processing an output signal of the image sensor; an operation switch for instructing for on/off control of electronic zoom operation; and a scan method switching circuit for controlling scan method of the image sensor according to with an instruction from the operation switch. The scan method switching circuit exerts control so that, when the electronic zoom operation is turned on, a pair of two horizontal pixel rows to be read simultaneously in the odd and even fields are made identical, and when the electronic zoom operation is turned off, a pair of two horizontal pixel rows to be read simultaneously in the odd and even fields are shifted by one row in the vertical direction. In this image pickup apparatus, the positions of lines having high vertical frequency responses and those of lines having low vertical frequency responses are approximately reversed between the odd and even fields, so that the vertical frequency response is made uniform over the entire screen as a one-frame image.

4 Claims, 33 Drawing Sheets 1H period $=\frac{1}{2}\{(a)+(c)\}$ zero

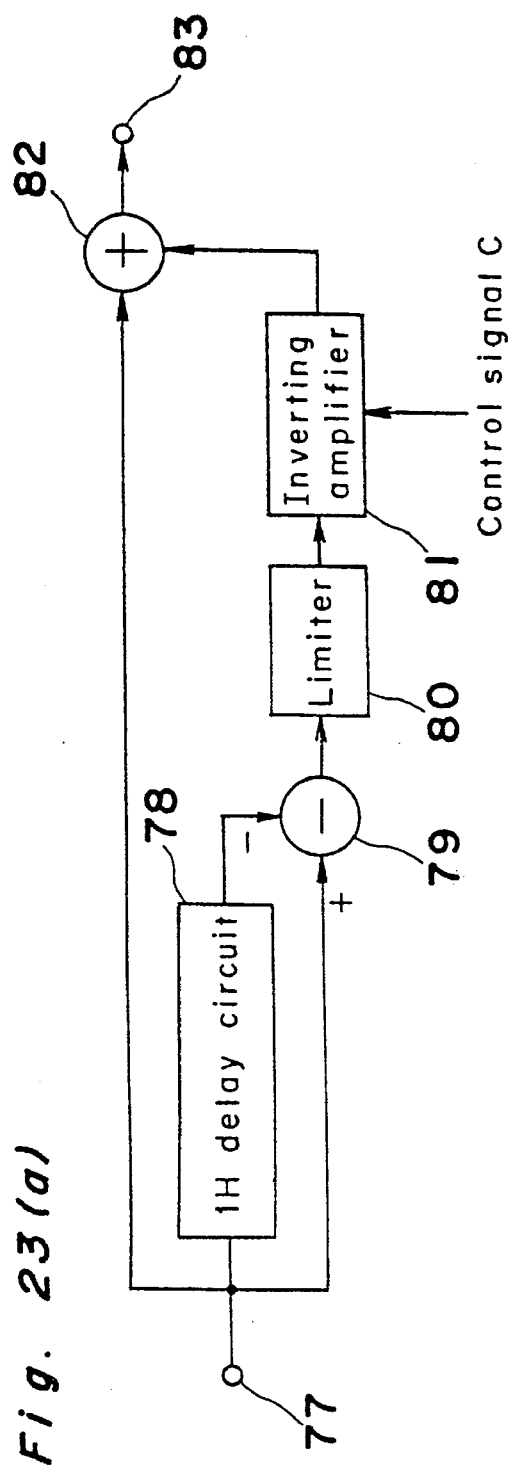
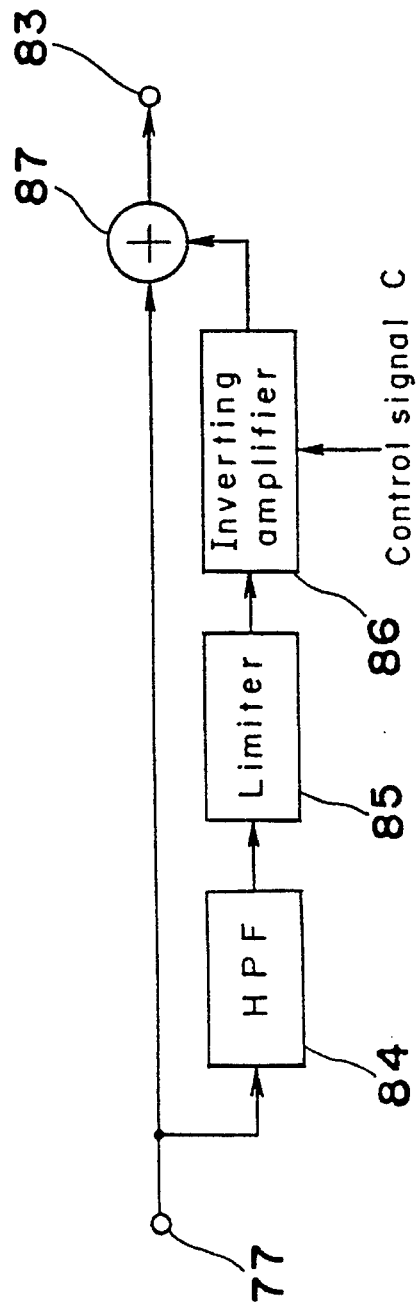
Fig. 23(a)
Fig. 23(b)

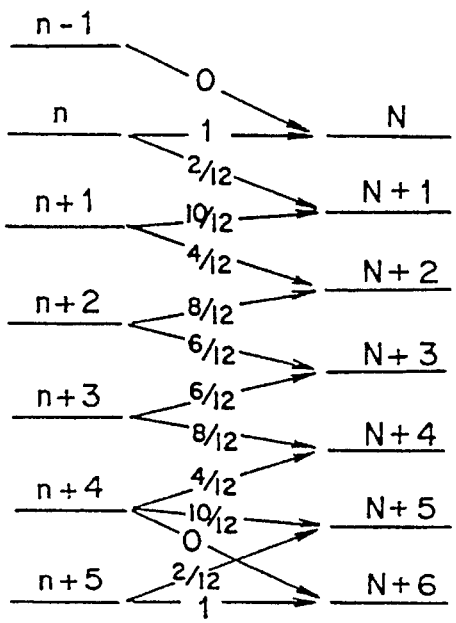
Fig. 35(a) PRIOR ART
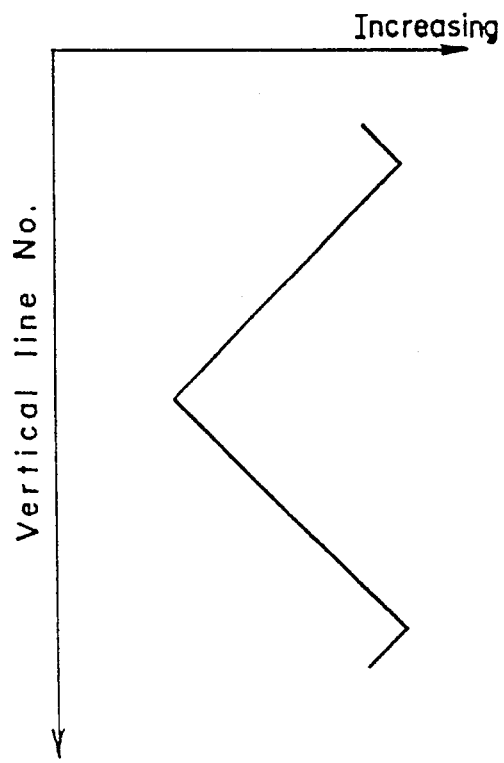
Fig. 35(b) PRIOR ART
Fig. 36 PRIOR ART
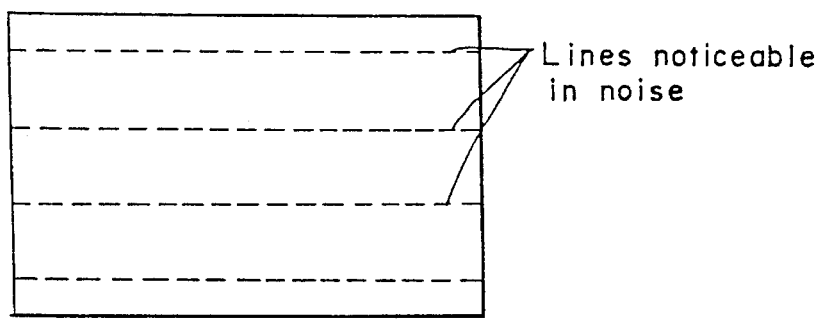

1

HORIZONTAL LINE INTERPOLATION CIRCUIT AND IMAGE PICKUP APPARATUS INCLUDING IT

This is a Rule 60 divisional application of Ser. No. 07/765,036, filed Sep. 24, 1991, now U.S. Pat. No. 5,268,758.

BACKGROUND OF THE INVENTION

1. Field of the Invention

The present invention relates to a horizontal line interpolation circuit which functions to increase or decrease the number of horizontal lines through interpolation processing such as an electronic zoom function, by which an image is electronically enlarged, or some standard conversion, and further relates to an image pickup apparatus provided with a horizontal line interpolation circuit which functions to increase or decrease the number of horizontal lines of a picked-up image through interpolation processing.

Recent years' development of the digital signal processing technique has made it easier to increase or decrease the number of horizontal lines of an image through interpolation processing. Accordingly, with the use of this technique, there have been increasing video equipment incorporating the so-called electronic zoom function, by which an image is electronically enlarged, or a standard conversion function by which a conversion is made from the NTSC system to the PAL system or some other standard. This is the reason that image-quality enhancement in the electronic zoom function or the standard conversion function is of growing importance.

2. Description of the Prior Art

As an example of the horizontal line interpolation circuit for increasing the number of horizontal lines of an image through an interpolation circuit, the prior art will be described below taking the case of an image pickup apparatus provided with an image enlargement function which is effected by increasing the number of horizontal lines of an image.

Known as a horizontal line interpolation circuit is the television standards converter circuit, a typical example of which is shown in a literature, Journal of the Japanese Television Society, Vol 29., No. 10, pp. 773 to 784, FIG. 3. Shown in FIG. 27 is a typical example of a conventional image pickup apparatus which electronically enlarges an image picked-up by an image sensor with the application of the above-mentioned horizontal line interpolation circuit. In the figure, reference numeral 1 denotes a solid state image sensor; numeral 2 denotes a driving circuit for the solid state image sensor 1; numeral 3 denotes an amplifier for amplifying an output signal from the solid state image sensor 1; numeral 68 denotes a process circuit for generating a luminance signal or the like from the output of the amplifier 3; numeral 69 denotes a vertical aperture correction signal generator; and numeral 70 denotes a first adder for obtaining a luminance signal whose vertical sharpness has been corrected by adding a luminance signal from the process circuit 68 and a vertical aperture correction signal from the vertical aperture correction signal generator circuit 69. Numeral 5 denotes an electronic zoom circuit for enlargement-processing an output signal from the first adder 70 by increasing the number of horizontal lines through interpolation processing, the electronic zoom circuit 5 generally comprising: a memory circuit 6; a memory control signal generator 10 for generating control signals for write, read, and addresses of the memory circuit 6; multipliers 7 and 8 for multiplying signals of two lines read from the memory circuit 6 by their respective interpolation weight coefficients w and (1−w); a second adder 9 for adding the output signals of the multipliers 7 and 8 to yield an interpolation output; and an interpolation coefficient generator 11 for generating the interpolation weight coefficients w and (1−w) for signals of two lines in accordance with instructions from a control section 64. The control section 64 generates control signals to the memory control signal generator 10 and the interpolation coefficient generator 11 according to the zoom multiplying factor of the electronic zoom and the screen position to be zoomed (zoom position). Numeral 71 denotes a selector for switching between electronically zoomed output of the electronic zoom circuit 5 and non-zoomed output of the first adder 70 in accordance with instructions from an operation switch 52; the selector 71 feeds a signal to an output terminal 66. Numeral 52 denotes an operation switch for giving instructions for on/off control of the electronic zoom as well as the zoom multiplying factor and screen position to be zoomed (zoom position) for the on-control of the electronic zoom. In addition, for example, the image pickup apparatus which is so arranged as to perform an electronic zoom operation of the same multiplying factor at all times does not require the selector 71 or the operation switch 52; such a conventional apparatus is shown in FIG. 28. As shown in the figure, all but the selector 71 and the operation switch 52 of its construction are the same as in FIG. 27.

In this case, the solid state image sensor 1 is scanned by a normal scan method (a scan method corresponding to an interlace scan), as shown in FIG. 32. More specifically, signal charge of each pixel of the solid state image sensor 1 is scanned in such a way that for the odd field, as indicated by a solid line in FIG. 32, two adjoining horizontal pixel rows are scanned by a one-time horizontal scan, while for the even field, as indicated by a dotted line in FIG. 32, the two pairs of horizontal pixel rows simultaneously read by a one-time horizontal scan are scanned by shifting one row with respect to the odd field in the vertical direction, wherein as to an output signal, the relationship between the scanning lines of the odd field and those of the even field is an interlace relationship, as shown in FIGS. 33 (a)–33 (b). In FIG. 33, a solid line represents scanning lines of the odd field, and a dotted line represents those of the even field.

Shown in FIG. 29 is a conceptual view of the image enlargement with the above-described image enlarging apparatus. Now assume that the solid state image sensor 1 puts out an image of 240 lines for one field and therefore 480 lines for one frame.

The case is described below where, of these lines, a portion equivalent to 200 lines for one field is enlarged to obtain an image for normal one field (i.e. a signal of 240 lines), as shown in FIG. 29. The multiplying factor is, in this case, 240÷200=1.2.

To increase the number of scanning lines from 200 to 240, the electronic zoom circuit 5 in FIG. 27 performs an interpolation processing as shown in FIG. 30 (a). In detail, for example, to obtain the (N+1) th line, input lines of the n th and (n+1) th lines are read from the memory circuit 6 and multiplied by interpolation weight coefficients relative to distances (here, 2/12 and 10/12), and then added together. Similarly, other output lines are also obtained from the upper and lower two lines by multiplying interpolation weight coefficients relative to distances and adding together. Here, the vertical frequency response characteristic of the output signal obtained by the interpolation processing is examined.

A line interpolated with interpolation weight coefficients of ½ and ½ results in the perfect average of input two lines, causing the vertical frequency response characteristic to be the lowest, while a line interpolated with interpolation weight coefficients of 1 and 0 allows one line of an input signal to be output as it is, causing the frequency response characteristic to be the highest.

In consequence, the vertical frequency response characteristic of each output line can be graphed as shown in FIG. 30 (b). The graph shows that the lines are either high or low in vertical frequency response, causing high and low portions in vertical frequency response to take place on the output screen, as shown in FIG. 31.

Next described is the case where one frame, or a two-field image (a signal of 240÷240=480 lines) is obtained by the same image enlargement processing as above. In this case, the electronic zoom circuit 5 in FIG. 27 performs an interpolation processing as shown in FIG. 33 (a). More specifically, odd field output lines are obtained in the odd field from odd field input lines in FIG. 33 (a), while even field output lines are obtained in the even field from even field input lines in the same figure (a). For example, to obtain the (N+1) th line of the odd field, input lines n and n+1 are read from the memory circuit 6, multiplied by interpolation weight coefficients relative to distances (in this case, 2/12 and 10/12), and added together. Similarly, other output lines are also obtained from the upper and lower two lines by multiplying interpolation weight coefficients relative to distances and adding together.

Here, vertical frequency response characteristic of the frame output image signal obtained by the interpolation processing is examined, as with the field image. The result is that the vertical frequency response characteristic of each output line can be graphed as shown in FIG. 33 (b). In the figure, where a solid line represents the characteristic of the odd field and a dotted line represents that of the even field, a pair of adjacent lines in the odd and even fields (e.g. the (N+1) th line of the odd field and the (N+1)' th line of the even field) are approximately equal in their interpolation weight coefficients. Thus, the positions of the lines having high vertical frequency responses and those of the lines having low vertical frequency responses coincide with each other between the odd and even fields, as shown in the figure. Accordingly, the positions of lines having high vertical frequency responses and those of the lines having low vertical frequency responses in the output image also coincide with each other between the odd and even fields, as shown in FIGS. 34 (a)–34 (b).

Next, vertical noise characteristic of an output signal obtained by the interpolation processing is examined. The vertical noise characteristic of an output signal obtained by the interpolation processing also results in that interpolated line being the perfect average of two input lines, as in the above-described cases, when the lines are interpolated with interpolation weight coefficients of ½ and ½. Accordingly, the resulting S/N ratio is improved by 3 dB at a maximum, hence a satisfactory S/N ratio. On the other hand, when the lines are interpolated with interpolation weight coefficients of 1 and 0, the input one line is output as is, with the result that the S/N ratio is not improved, hence the worst S/N ratio. In consequence, the noise level characteristic for each output line can be graphed as shown in FIG. 35 (b). This indicates that an electronically zoomed output image has different S/N ratios of lines, causing noise differences between lines to be viewed as disturbing lateral stripes in the output image, as shown in FIG. 36.

As a note to the above description, which has been made on an image pickup apparatus provided with the electronic zoom function (image enlarging function), such a problem that the vertical frequency response and noise characteristics increase depending on vertical positions of the screen is not limited to the above apparatus, but commonly arises in image enlarging apparatus for electronically enlarging images.

However, the conventional horizontal line interpolation circuit as described above has the following problem. As stated before, the vertical frequency response characteristic of an output line varies with interpolation weight coefficients and therefore differs between output lines. As a result, the output screen involves high and low portions in vertical frequency response, causing the vertical frequency response of an image to be diverse to a great extent depending on the vertical positions of the screen. This disadvantageously results in a most undesirable, unfriendly-to-see image.

Also in one frame image made up of two fields, the positions of the lines having high frequency responses and those of the lines having low frequency responses approximately coincide with each other between the odd and even fields, causing high and low portions in vertical frequency response to take place also in the output screen made up of two fields. This results in a most undesirable, unfriendly-to-see image with the vertical frequency response of an image diversified to a great extent depending on the vertical position of an image.

Moreover, the image enlarging apparatus and the image pickup apparatus which perform conventional electronic zoom as described above, as stated above, involve different S/N ratios of lines in an electronically zoomed output image, which appear as disturbing lateral stripes in an output image. Accordingly, in common image enlarging apparatus, especially when input signal level is such low as to require the gain of a gain control amplifier to be increased, the S/N ratio of a signal entered into the electronic zoom circuit is unsatisfactory with disturbing lateral stripes conspicuously present. Further, in the image pickup apparatus, especially when a dark object is picked up which requires the gain of the gain control amplifier to be increased, the S/N ratio of a signal entered into the electronic zoom circuit is unsatisfactory, causing the disturbing lateral stripes to be conspicuously present.

SUMMARY OF THE INVENTION

The present invention has been developed with a view to substantially solving the above described disadvantages and has for its essential object to provide an improved horizontal line interpolation circuit and an image pickup apparatus with a horizontal line interpolation function in which the vertical frequency response of an image will not vary with the vertical position of the screen. The present invention has for its another important object to provide a horizontal line interpolation circuit and an image pickup apparatus with a horizontal line interpolation function which are reduced in disturbing lateral stripes due to S/N differences between the lines of the screen.

In order to achieve the aforementioned object, a first apparatus of the present invention is a horizontal line interpolation circuit comprising: an interpolation circuit for performing interpolation processing for horizontal lines of an input image signal; and a circuit for controlling the gain of the vertical aperture correction depending on an interpolation weight coefficient of the interpolation processing.

In the first apparatus of the present invention, the vertical frequency response is made uniform over the entire screen by controlling the gain of the vertical aperture correction according to the line interpolation coefficients.

A second apparatus of the present invention is an image pickup apparatus comprising: a signal processing circuit for processing output signals of an image sensor; an interpolation circuit for performing interpolation processing for horizontal lines of output of the signal processing circuit; and a control circuit for controlling the gain the vertical aperture correction according to the interpolation coefficient for the interpolation processing.

In the second apparatus of the present invention, the vertical frequency response is made uniform over approximately the entire screen by controlling the gain of the vertical aperture correction according to the line interpolation coefficients.

A third apparatus of the present invention is an image pickup apparatus comprising: an image sensor for simultaneously reading signals of two adjoining horizontal pixel rows by one-time scan; an electronic zoom circuit for enlargement-processing an output signal of the image sensor; an operation switch for giving an instruction for on/off control of electronic zoom operation; and a scan method switching circuit for controlling scan method of the image sensor in accordance with an instruction from the operation switch, wherein said scan method switching circuit exerts control so that, when the electronic zoom operation is selected, a pair of two horizontal pixel rows to be read simultaneously in odd and even fields are made identical, and that when the electronic zoom operation is not selected, a pair of two horizontal pixel rows to be read simultaneously in the odd and even fields are shifted by one row in the vertical direction.

In the third apparatus of the present invention, the positions of lines having high vertical frequency responses and those of lines having low vertical frequency responses are approximately reversed between the odd and even fields, so that the vertical frequency response is made uniform over the entire screen as a one-frame image.

A fourth apparatus of the present invention is an image pickup apparatus comprising: an image sensor for simultaneously reading signals of two adjoining horizontal pixel rows by one-time horizontal scan; a signal processing circuit for processing output signals of the image sensor; an interpolation circuit for performing interpolation processing for horizontal lines of output of the signal processing circuit; a control circuit for controlling the gain of vertical aperture correction according to the interpolation coefficient for the interpolation processing; an operation switch for instructing on/off control of the horizontal interpolation processing; and a scan format switching circuit for controlling the scan format of the image sensor in accordance with an instruction from the operation switch, wherein the scan format switching circuit exerts control so that, when the electronic zoom operation is selected, a pair of two horizontal pixel rows to be read simultaneously in the odd and even fields are made identical, and that when the electronic zoom operation is not selected, a pair of two horizontal pixel rows to be read simultaneously in the odd and even fields are shifted by one row in the vertical direction.

In the fourth apparatus of the present invention, the vertical frequency response is made uniform over the approximately entire screen by controlling the gain of vertical aperture correction according to the line interpolation coefficient, and moreover the positions of lines having high vertical frequency responses and those of lines having low vertical frequency responses are approximately reversed between the odd and even fields, so that the vertical frequency response is made uniform over the entire screen as a one-frame image.

A fifth apparatus of the present invention is a horizontal line interpolation circuit comprising: an interpolation circuit for performing interpolation processing for horizontal lines of an input image signal; and a noise reduction circuit for reducing noise of an output signal of the horizontal line interpolation circuit.

Lastly, a sixth apparatus of the present invention is an image pickup apparatus with horizontal line interpolation function, comprising: a signal processing circuit for processing output signals of an image sensor; an interpolation circuit for performing interpolation processing for horizontal lines of an output signal of the horizontal line interpolation circuit; and a noise reduction circuit for reducing noise of an output signal of the horizontal line interpolation circuit.

In the fifth and sixth apparatus of the present invention, noise of an output signal of the horizontal line interpolation circuit is reduced so as to suppress the disturbance of lateral stripes.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 23 (a)–23 (b) are block diagrams showing a practical construction of the noise reduction circuit used in an embodiment of the fifth and sixth apparatus of the present invention;

FIGS. 35 (a)–35 (b) are explanatory views for explaining the interpolation processing for electronic zoom operation and the vertical noise level of the conventional image pickup apparatus; and FIG. 36 is a schematic view for explaining disturbing lateral stripes resulting from noise level differences between lines of an image obtained by electronic zoom operation in the conventional image pickup apparatus.

DETAILED DESCRIPTION OF THE PREFERRED EMBODIMENTS

Figure 1:
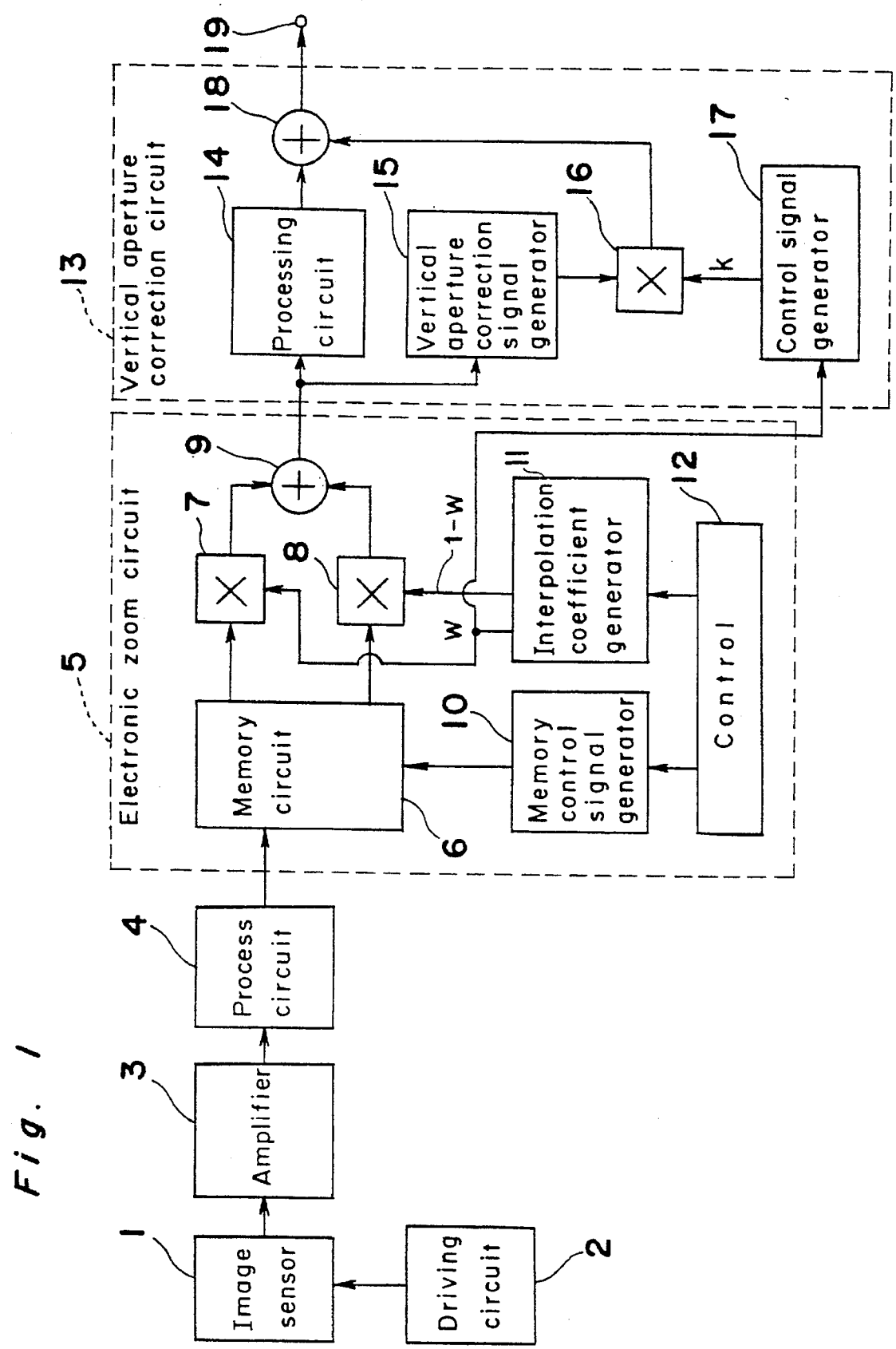
FIG. 1 is a block diagram showing the construction of an image pickup apparatus of a first embodiment corresponding to a first and second apparatus of the present invention.

Before the description of the present invention proceeds, it to be noted that like parts are designated by like reference numerals throughout the accompanying drawings.

The present invention will be described below in conjunction with preferred embodiments thereof with reference to the accompanying drawings, taking the case of an image pickup apparatus provided with image enlargement function, as an horizontal line interpolation circuit, which is effected by increasing the number of horizontal lines through interpolation processing.

FIG. 1 is a block diagram showing a first embodiment of the first apparatus of the present invention. Referring to the figure, its construction and operation is explained.

In the figure, reference numeral 1 denotes an image sensor; numeral 2 denotes a driving circuit for the image sensor 1; numeral 3 denotes an amplifier for amplifying an output signal from the image sensor 1; and numeral 4 denotes a process circuit for generating luminance signals and other signals from the output of the amplifier 3. Numeral 5 denotes an electronic zoom circuit for enlargement-processing an output signal from the process circuit 4 through horizontal line interpolation processing, the electronic zoom circuit 5 generally comprising: a memory circuit 6; a memory control signal generator 10 for generating control signals for write, read, and addresses of the memory circuit multipliers 7 and 8 for multiplying signals of two lines read from the memory circuit 6 by their respective interpolation weight coefficients w and (1−w); an adder 9 for adding the output signals of the multipliers 7 and 8 to yield an interpolation output; and an interpolation coefficient generator 11 for generating the interpolation weight coefficients w and (1−w) for signals of two lines in accordance with instructions from a control section 12. The control section 12 controls the zoom multiplying factor of the electronic zoom and the screen position to be zoomed (zoom position). Numeral 13 denotes a vertical aperture correction circuit for performing vertical aperture correction for output image signals of the electronic zoom circuit 5, the vertical aperture correction circuit 13 serving to feed a signal to an output terminal 19. The vertical aperture correction circuit 13 comprises: a vertical aperture correction signal generator 15 for generating a vertical aperture correction signal from a signal from the electronic zoom circuit 5; a control signal generator circuit 17 for generating a control signal k according to the interpolation coefficient w of the electronic zoom circuit 5; a third multiplier 16 for controlling the level of a vertical aperture correction signal according to the control signal k; a processing circuit 14 for performing delay processing and the like to a signal from the electronic zoom circuit 5; and a second adder 18 for adding a signal from the process circuit 14 and a signal from the third multiplier 16 so as to thereby obtain an image signal having been controlled for the level of vertical aperture correction according to the interpolation coefficient w of the electronic zoom circuit 5.

Figure 27:
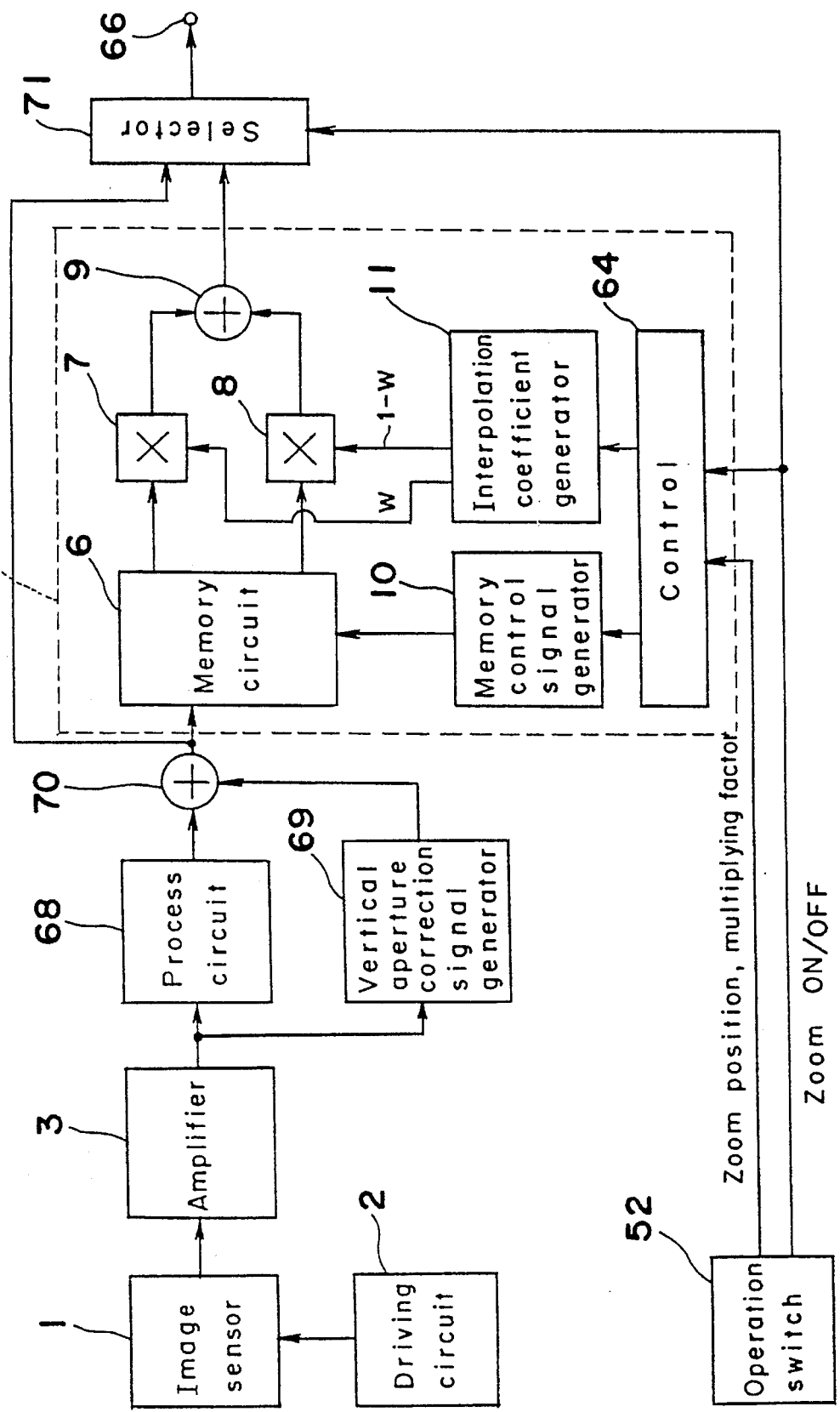
FIG. 27 is a block diagram showing the construction of an example of conventional image pickup apparatus provided with image enlargement function by horizontal line interpolation.
Figure 28:
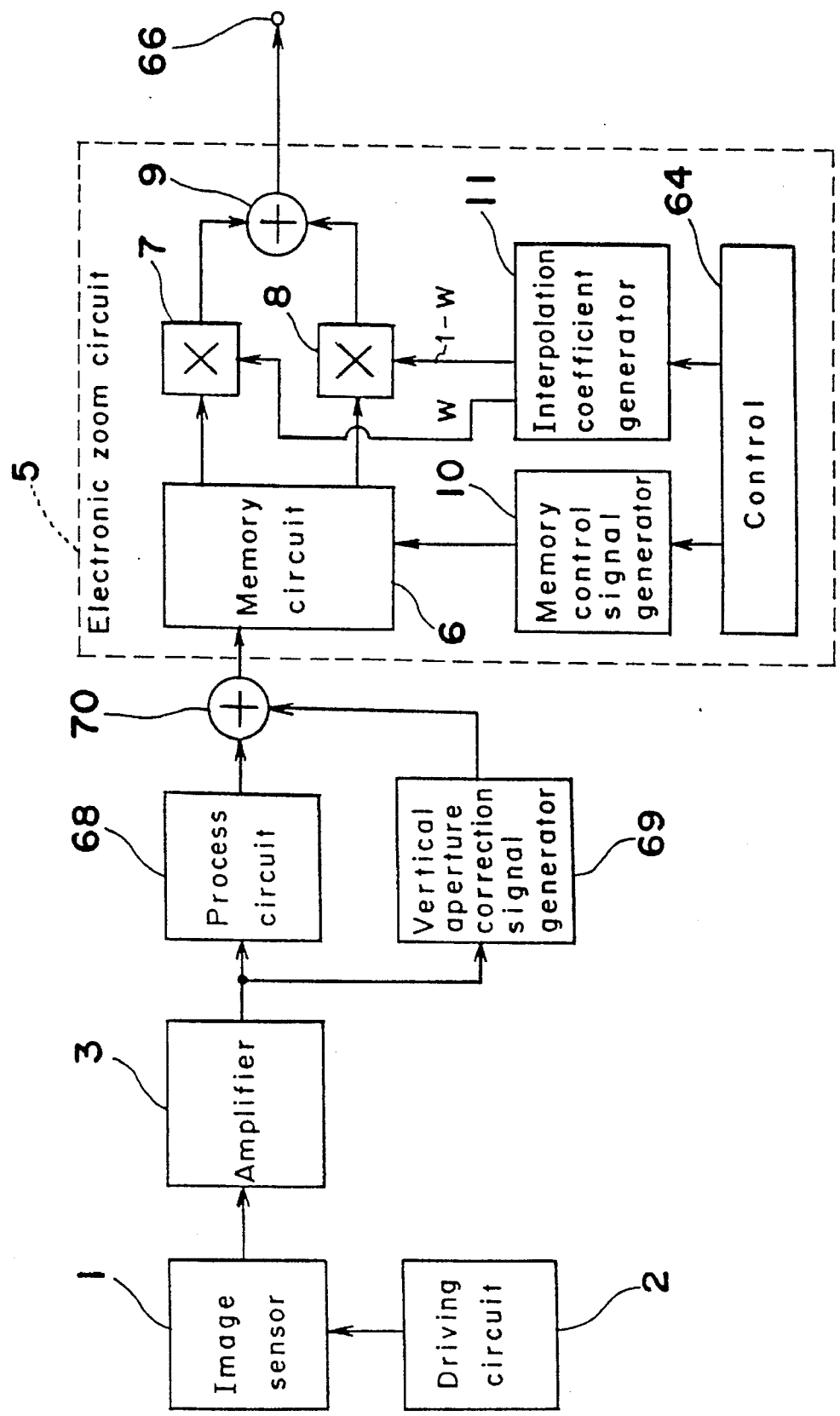
FIG. 28 is a block diagram showing the construction of another example of the conventional image pickup apparatus provided with image enlargement function by horizontal line interpolation.
Figure 29:
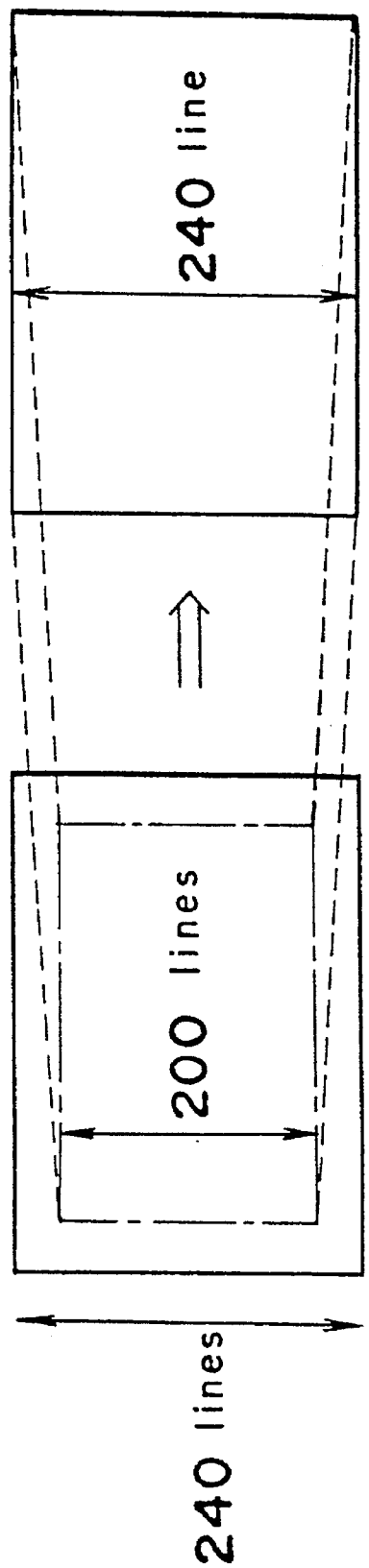
FIG. 29 is a schematic view showing the concept of enlargement processing of an image by electronic zoom.

Referring next to the operation of the present embodiment, the operation of the electronic zoom circuit 5 is the same as in the conventional counterpart in FIG. 27 and a detailed description thereof has been omitted in the following detailed description of the operation of the vertical aperture correction circuit 13.

Figure 2:
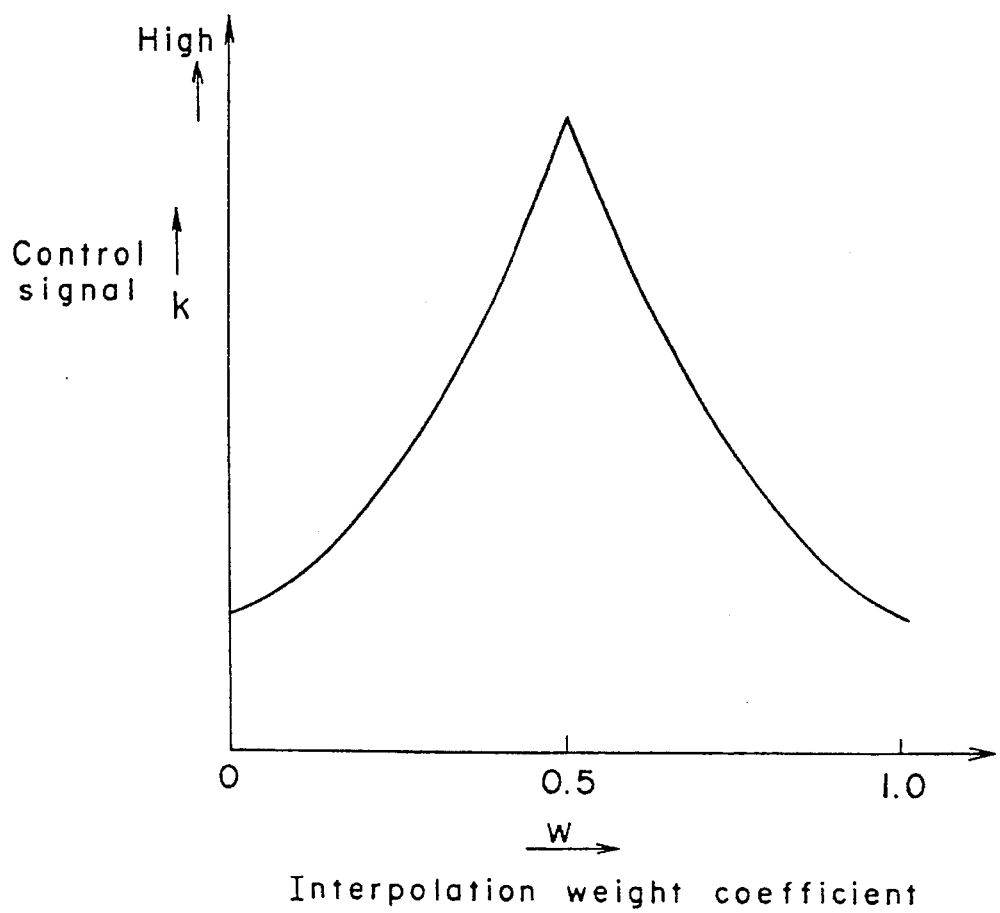
FIG. 2 is a characteristic chart showing an example of the level control characteristic charts of interpolation weight coefficient of the horizontal line interpolation circuit vs. vertical aperture correction control signal in the first and second apparatus of the present invention.
Figure 3:
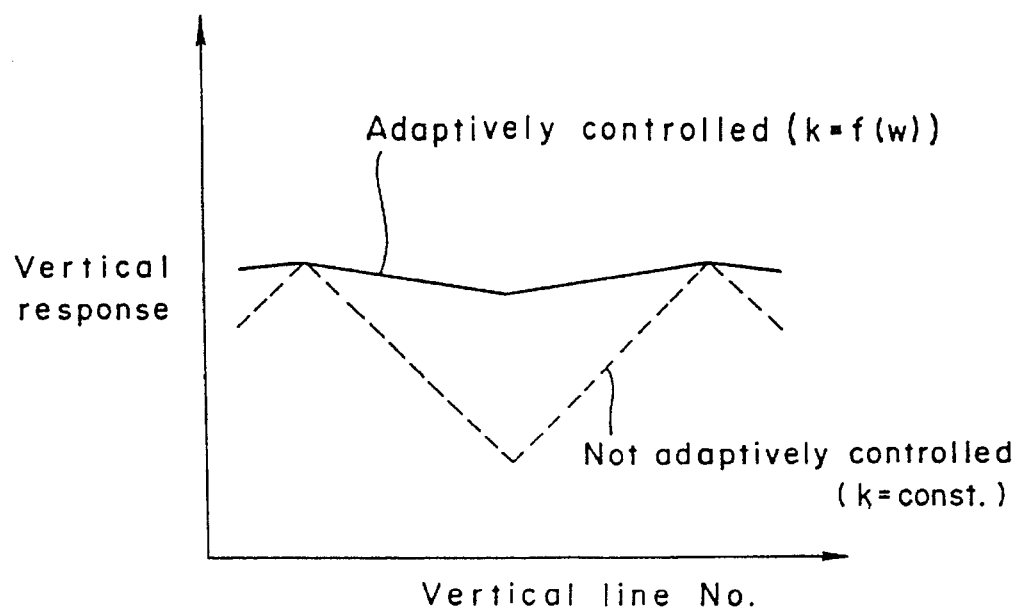
FIG. 3 is a characteristic chart showing vertical responses of lines of an image obtained by the horizontal line interpolation circuit in the first and second apparatus of the present invention.
Figure 30B:
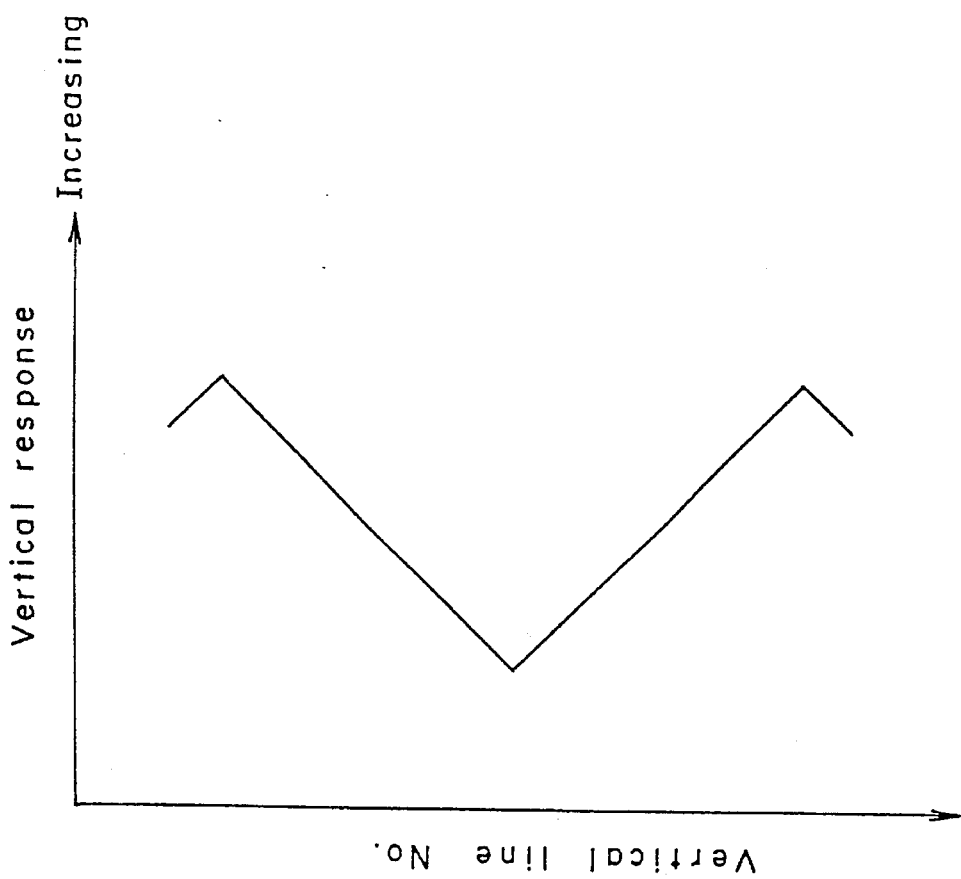
FIGS. 30 (a) and 30 (b) are views schematically showing the horizontal line interpolation processing of the conventional image pickup apparatus and showing the vertical responses of lines.
Figure 30A:
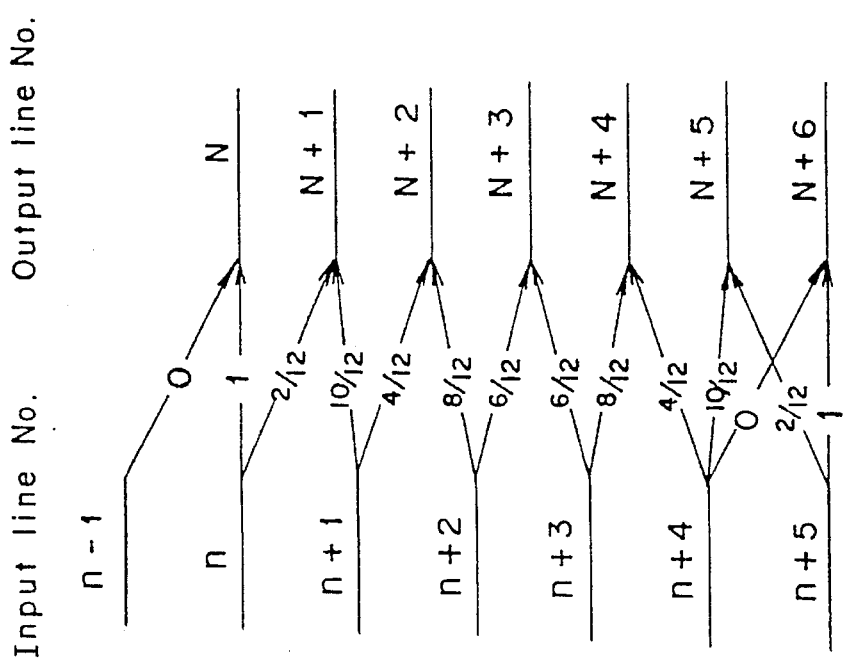
Figure 31:
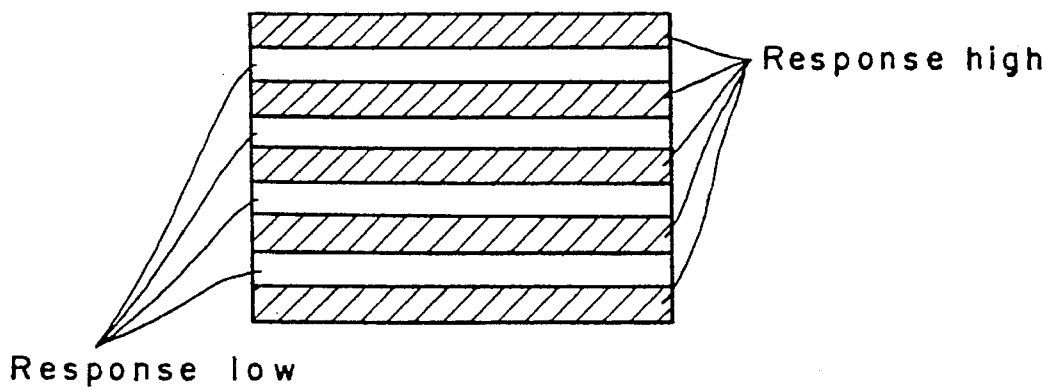
FIG. 31 is a schematic view showing the distribution of high and low vertical responses of an image obtained by electronic zoom operation by horizontal line interpolation in the conventional image pickup apparatus.

The control signal generator 17 forms a control signal k that depends on the interpolation weight coefficient w from the interpolation coefficient generator 11 (the signal takes a value proportional to the coefficient w when the w is less than 0.5 and proportional to that of (1−w) when the w is more than 0.5, as shown in FIG. 2), and then a vertical aperture correction signal generated by the vertical aperture correction signal generator 15 is multiplied in the control signal k by the multiplier 16, thus controlling the level of the vertical aperture correction signal. Subsequently, the output of the multiplier 16 is added to a signal of the process circuit 14 (a signal not subjected to vertical aperture correction) by the adder 18, so that a signal adaptively controlled in vertical sharpness according to the interpolation weight coefficient w is fed to the output terminal 19. More specifically, lines having smaller coefficients of either of the interpolation weight coefficients w or (1−w), whichever a smaller, that is, those having greater vertical frequency responses as previously described in the section discussing the prior art, are controlled so as to lower the level of vertical aperture correction signals, while lines having greater coefficients of either of the interpolation weight coefficients w or (1−w), whichever is smaller, that is, those having smaller vertical frequency responses as previously described in the section discussing the prior art, are controlled so as to heighten the level of vertical aperture correction signals. Accordingly, differences in vertical frequency response between lines of an image signal after being electronically zoomed are substantially reduced as shown in the characteristic view of FIG. 3, resulting in an appropriately corrected image, which otherwise would be a most undesirable, unfriendly-to-see image due to the vertical frequency response of the image greatly differing depending on vertical positions of the screen as described for the prior art. In addition, FIG. 3 is a chart showing the vertical responses of lines of an image, similar to that shown in FIG. 30 (b). In FIG. 3, the dotted curve represents the characteristic of the prior art, while the solid curve shows the characteristic obtained at the output terminal 19 after effecting adaptive control to the level of vertical aperture correction (controlled according to the interpolation weight coefficient w) by the vertical aperture correction circuit 13 of the present invention showing in FIG. 1.

Figure 4:
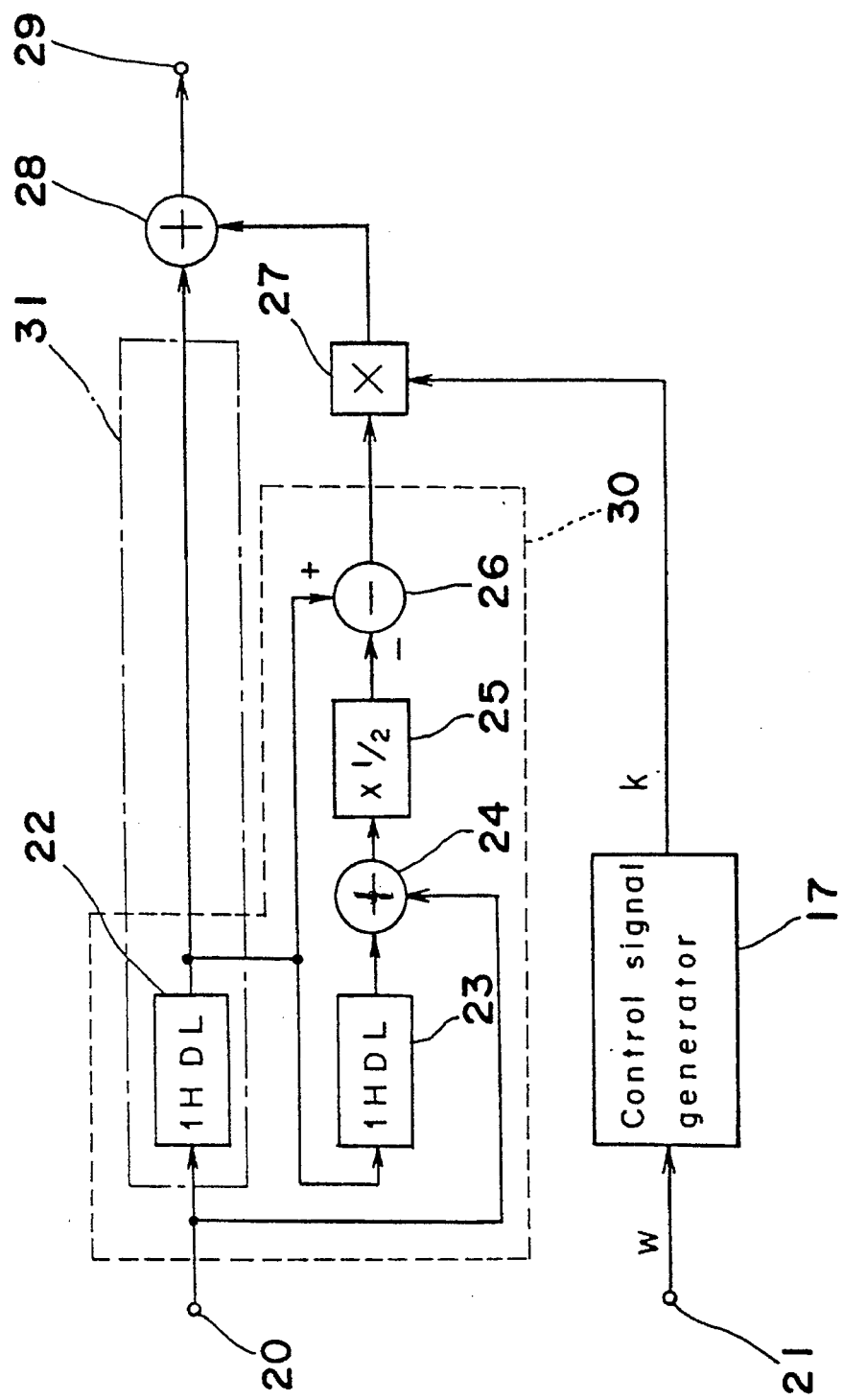
FIG. 4 is a block diagram showing an example of practical construction of the vertical aperture correction circuit in FIG. 1.
Figure 5A:
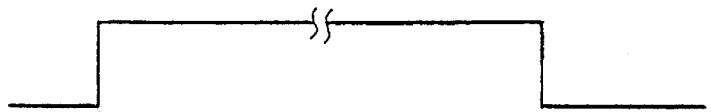
FIGS. 5 (a)–5 (f) are charts showing signal waveforms for explaining the operation in connection with FIG. 4.
Figure 5B:
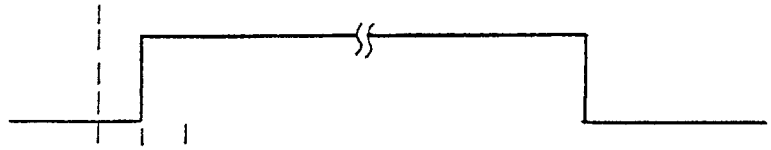
Figure 5C:
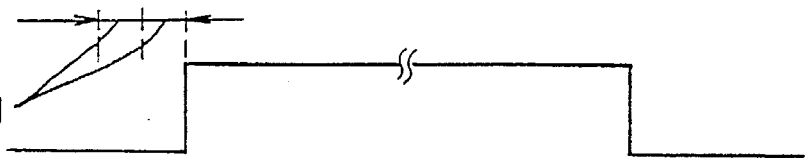
Figure 5D:
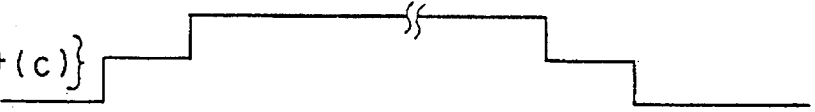
Figure 5E:
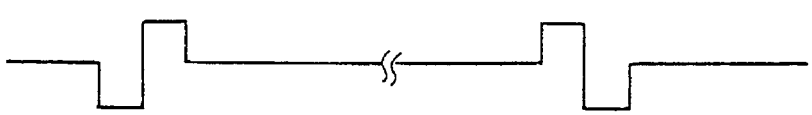
Figure 5F:
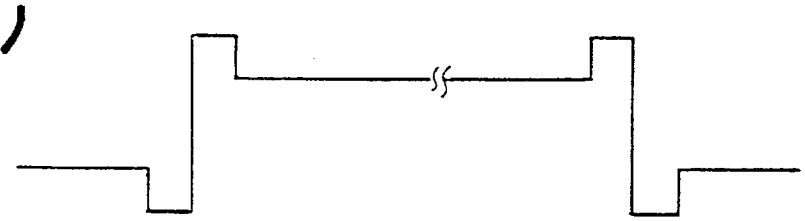

A detailed construction of the vertical aperture correction circuit 13 may be as shown in FIG. 4. Referring to FIG. 4, a zoom-processed image signal (see the waveform of FIG. 5 (a)) input to an image signal input terminal 20 is delayed by a first one horizontal-scan-period delay circuit (hereinafter, referred to as a 1H delay circuit) 22 and a second 1H delay circuit 23 thereby to obtain a 1H delay signal and a 2H delay signal, respectively (see the waveforms of FIGS. 5 (b) and 5 (c). After adding the input image signal (see the waveform of FIG. 5 (a)) and the 2H delay signal (see the waveform of FIG. 5 (c)) by a first adder 24, the resulting signal is multiplied by ½ by a ½ multiplier circuit 25 (see the waveform of FIG. 5 (d)) is subtracted from the 1H delay signal (see the waveform of FIG. 5 (b)) by a subtracter 26, thereby providing a vertical aperture signal (see the waveform of FIG. 5 (e)). On the other hand, a control input terminal 21 has the interpolation weight coefficient w input thereto, and the control signal generator 17 generates a control signal k that varies depending on the interpolation weight coefficient w as shown in FIG. 2. Then, the vertical aperture correction signal (see the waveform of FIG. 5 (e)) is multiplied by the control signal k in a multiplier 27, thus controlling the level of the vertical aperture correction signal. The output of the multiplier 27 is added to the output signal of the first 1H delay circuit 22 (1H delay signal, see the waveform of FIG. 5 (b) by a second adder 28, so that a signal whose vertical sharpness has adaptively been controlled according to the interpolation weight coefficient w (see the waveform of FIG. 5 (f) is fed to an output terminal 29. Consequently, a block 31 in FIG. 4 corresponds to the process circuit 14 in FIG. 1, and a block 30 in FIG. 4 corresponds to the vertical aperture correction signal generator 15 in FIG. 15.

Figure 13B:
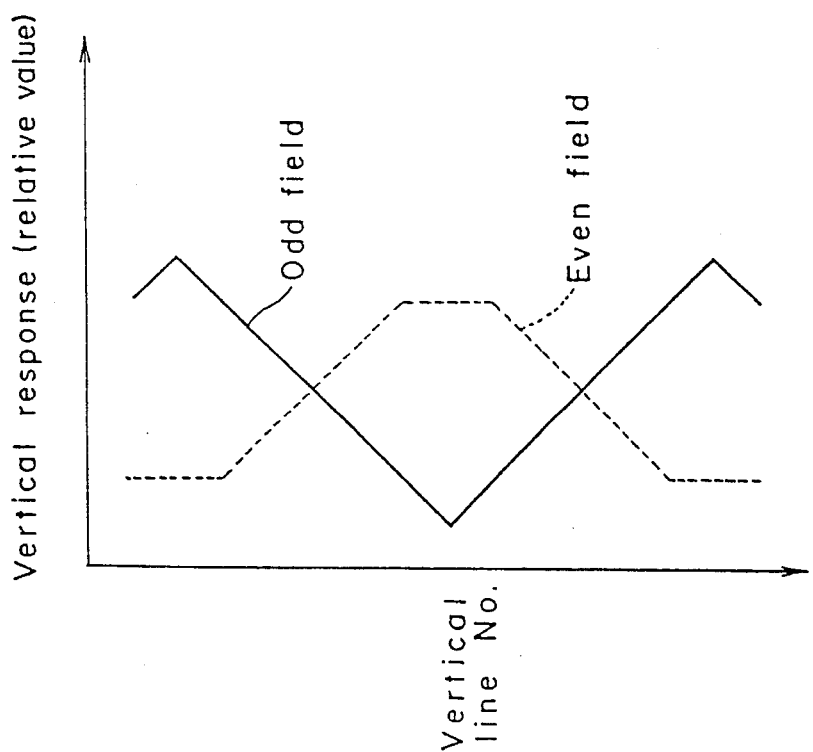
FIGS. 13 (a)–13 (b) are explanatory views for explaining the interpolation processing of an electronic zoom operation and the vertical responses of lines in the first embodiment of the third apparatus of the present invention.
Figure 13A:
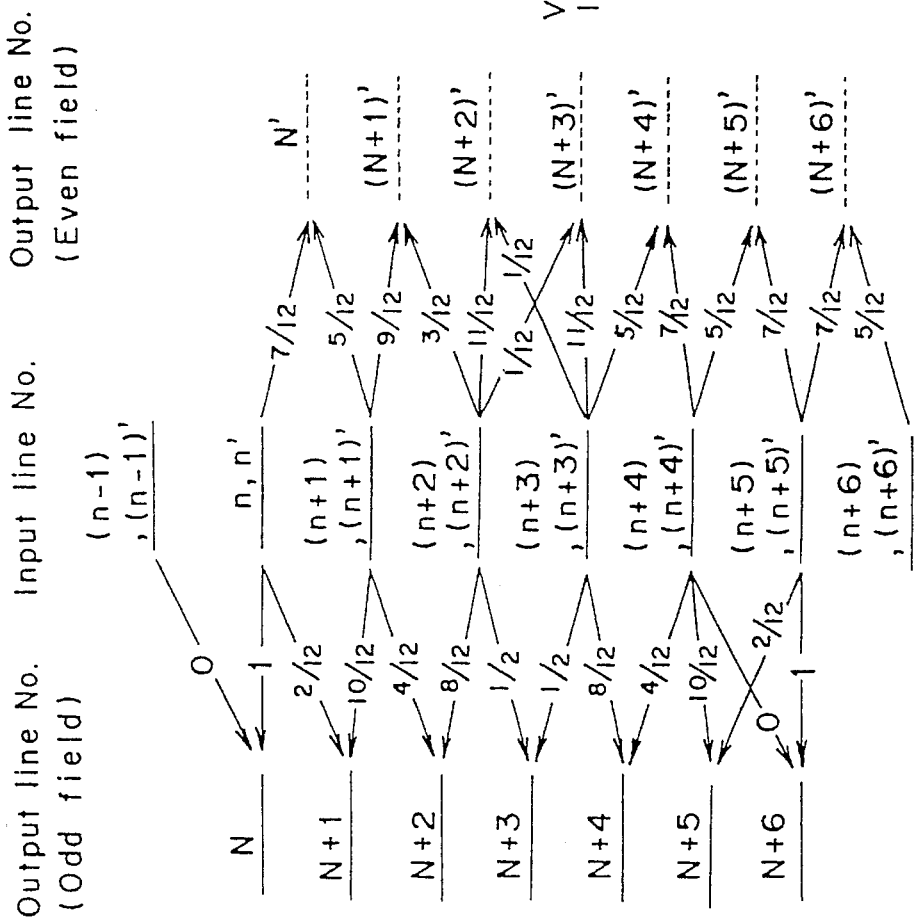

As shown above, when the vertical aperture correction circuit 13 is disposed behind the electronic zoom circuit 5 that enlargement-processes an input signal through horizontal line interpolation, there are some advantages: that is, the vertical aperture correction can be effected at a stage at which the number of horizontal lines has been increased by interpolation processing, allowing aperture correction to be effected at higher vertical frequencies with the result of more increased vertical sharpness; the horizontal line of a signal subject to vertical aperture correction and the interpolation weight coefficient w correspond to each other at one to one (as apparent from FIG. 13 (a), the interpolation weight coefficient w is inherent to output line Nos., not corresponding to input line Nos. at one to one), thus allowing the level of vertical aperture correction to be accurately controlled according to the interpolation weight coefficient w.

Figure 6:
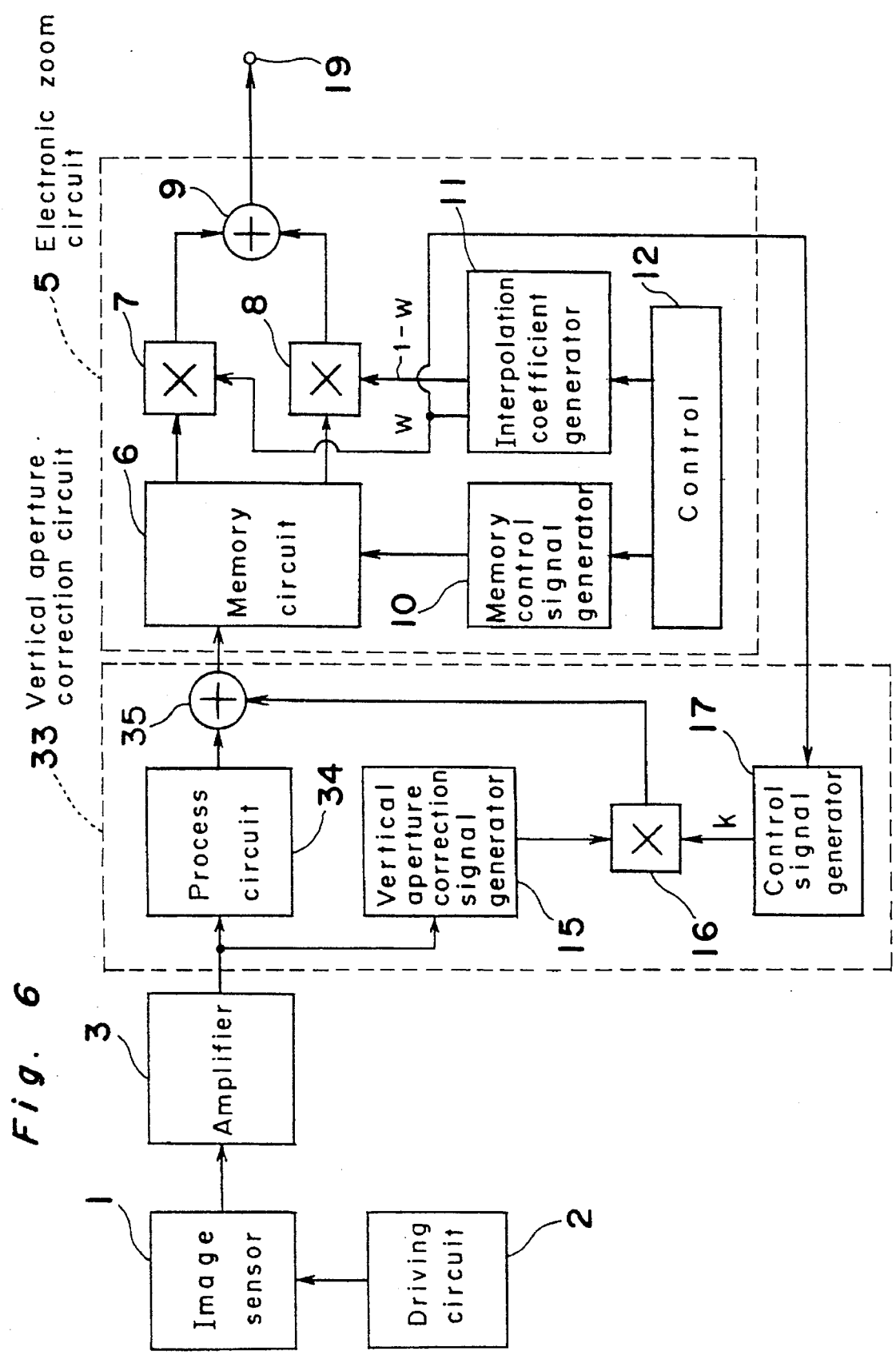
FIG. 6 is a block diagram showing the construction of a second embodiment of the first and second apparatus of the present invention.

FIG. 6 is a block diagram showing a second embodiment of the present invention. Its difference from the first embodiment of FIG. 1 exists in that a vertical aperture correction circuit 33 is disposed ahead of the electronic zoom circuit 5, while in the first embodiment the vertical aperture correction circuit 13 is disposed behind the electronic zoom circuit 5 that enlargement-processes an input signal through horizontal line interpolation.

In FIG. 6, reference numeral 1 denotes an image sensor; numeral 2 denotes a driving circuit for the image sensor 1; 3 denotes an amplifier for amplifying an output signal from the image sensor 1; numeral 34 denotes a process circuit for generating luminance signals and others signals from the output of the amplifier 3; numeral 15 denotes a vertical aperture correction signal generator for generating a vertical aperture correction signal; numeral 17 denotes a control signal generator for generating a control signal k corresponding to the interpolation weight coefficient w of the electronic zoom circuit 5; numeral 16 denotes a third multiplier for controlling the level of a vertical aperture correction signal according to the control signal k; numeral 35 denotes a first adder for adding a luminance signal from the process circuit 34 and a vertical aperture correction signal from the vertical aperture correction signal generator 15 so as to thereby obtain a luminance signal that has been corrected in vertical sharpness. The electronic zoom circuit 5 for enlargement-processing an output signal from the first adder 35 by increasing the number of horizontal lines through interpolation processing is identical to the electronic zoom circuit 5 in the first embodiment.

With the above arrangement, by controlling the level of vertical aperture correction according to the interpolation weight coefficient w in the same manner as in the embodiment of FIG. 1, similar effects can be obtained, although not accurately as in the first embodiment. Moreover, the process circuit 4 and the process circuit 14 in FIG. 1 can be integrated in construction, which allows a simplified construction. In particular, when it is applied to the image pickup apparatus with image enlargement function, it is advantageously possible to simplify the construction by sharing the circuit components of the process circuit and the vertical aperture correction signal generator circuit.

Figure 7:
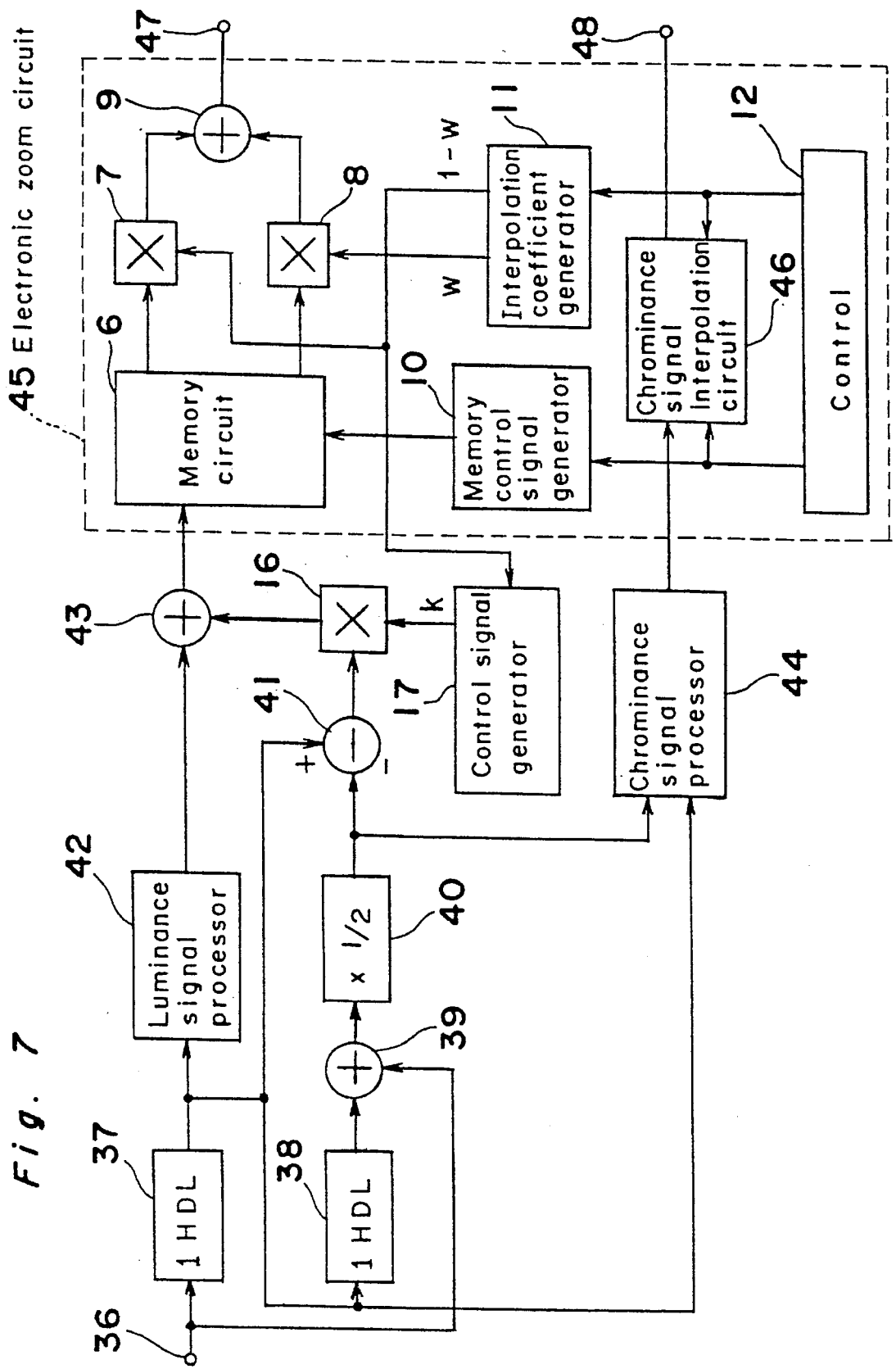
FIG. 7 is a block diagram showing a detailed construction of the main part of FIG. 6.

FIG. 7 shows a detailed construction of an image pickup apparatus with an image enlargement function in which circuit components of a camera process circuit and a vertical aperture correction signal generator are shared.

Figure 8:
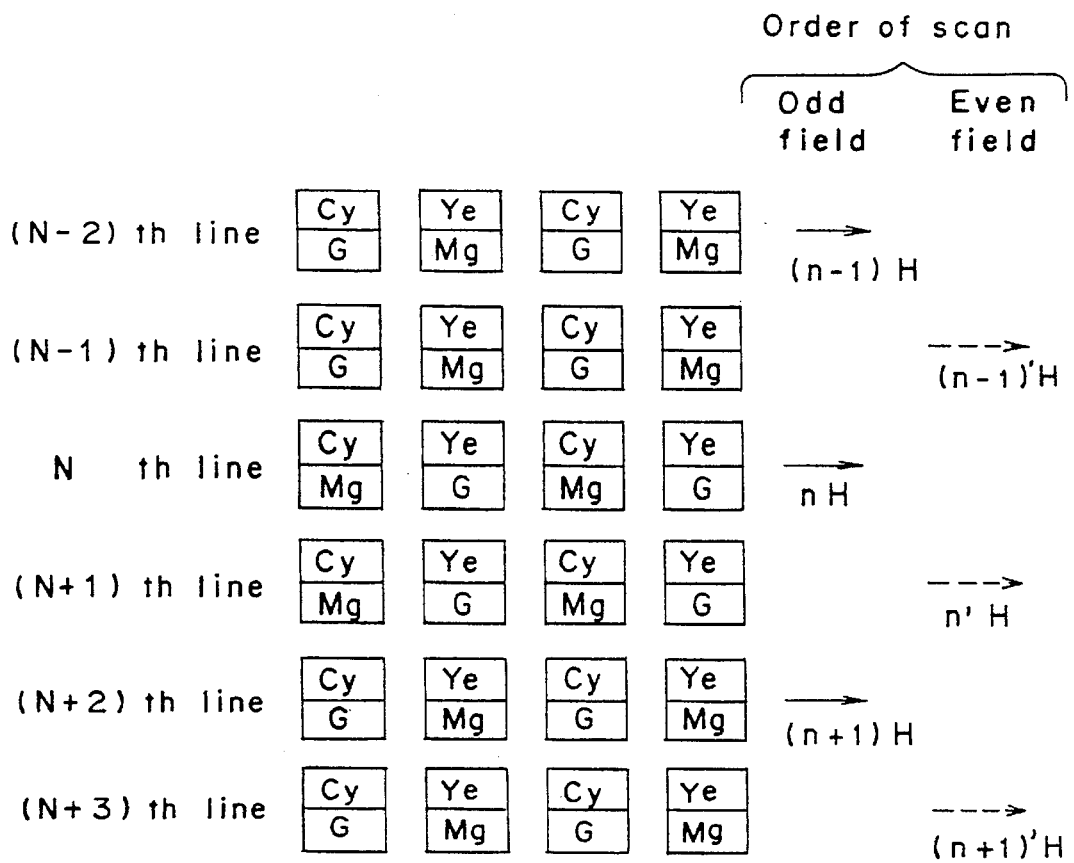
FIGS. 8 and 9 are schematic views showing an example of the color filter of the color image sensor used in the image pickup apparatus in FIG. 7, where FIG. 8 exemplifies the case in which color filters are provided two colors for one pixel and signals of the entire screen by two fields are read through an interlace scan, and FIG. 9 exemplifies the case in which color filters are provided one color for one pixel and signals of two adjoining horizontal lines are read to effect color separation and moreover a pair of two horizontal lines to be read simultaneously in the fields are shifted by one line thereby to obtain an interlace scanned one-frame image signal.
Figure 9:
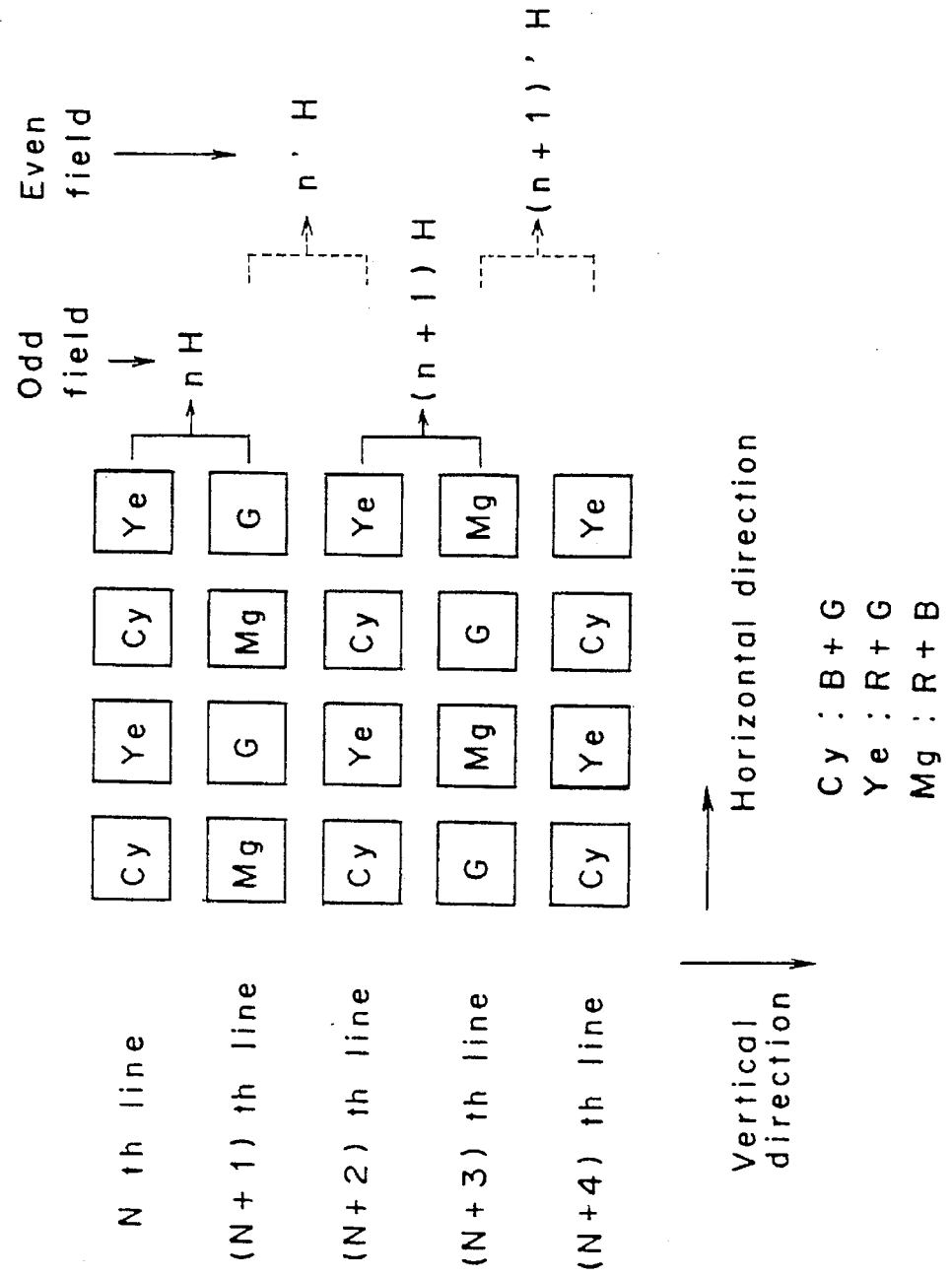

In the figure, it is assumed that a signal is input to an input terminal 36 in which a luminance signal and a chrominance signal from the color image sensor provided with such a color filter as shown in FIG. 8 or 9 are synthesized. The signal is delayed by a first 1H delay circuit 37 and a second 1H delay circuit 38, thus providing a 1H delay signal and a 2H delay signal, respectively. After adding the input image signal and the 2H delay signal by a first adder 39, the resulting signal multiplied by ½ by a ½ multiplier circuit 40 is subtracted from the 1H delay signal by a subtracter circuit 41, thereby providing a vertical aperture signal. In addition, an output signal of the first 1H delay circuit 37 is processed for luminance signal separation and the like by a luminance signal processing circuit 42 so that the luminance signal is extracted. On the other hand, the control signal generator 17 generates a control signal k that varies depending on the interpolation weight coefficient w, as shown in FIG. 2, from an electronic zoom circuit 45. Then, the vertical aperture correction signal is multiplied by the control signal k in the multiplier 16, thus controlling the level of the vertical aperture correction signal. The output of the multiplier 16 is added to the luminance signal, an output signal of the luminance signal processing circuit 42, by a second adder 43, thereby added to the luminance signal, an interpolation weight coefficient output signal, so that a signal whose vertical sharpness has adaptively been controlled according to the interpolation weight coefficient w is obtained.

Further, the 1H delay signal and the output of the ½ multiplier circuit 40 are both input to a chrominance signal processing circuit 44, where it is processed for color separation, white balance correction, and the like, providing a chrominance signal.

Then, the luminance signal having adaptively been controlled in vertical sharpness according to the interpolation weight coefficient w an output of the adder 43, is subjected to horizontal line interpolation by the electronic zoom circuit 45 that comprises: a memory circuit 6; a memory control signal generator 10 for generating control signals for write, read, and addresses of the memory circuit 6; multipliers 7 and 8 for multiplying signals of two lines read from the memory circuit 6 by their respective interpolation weight coefficients w and (1−w); a second adder 9 for adding output signals of the multipliers 7 and 8 to feed an interpolation output to an output terminal 47; and an interpolation coefficient generator 11 for generating the interpolation weight coefficients w and (1−w) for signals of two lines in compliance with instructions from a control section 12. Also, a chrominance signal from the chrominance signal processing circuit 44 is processed for horizontal line interpolation by a chrominance signal interpolation circuit 46, which has a basic construction similar to that for luminance signals, and fed to a chrominance signal output terminal 48.

The following is the outline of processing for obtaining a luminance signal and a chrominance signal from the signal derived from the color image sensor 1 provided with such a color filter as shown in FIGS. 8 and 9.

Figure 10:
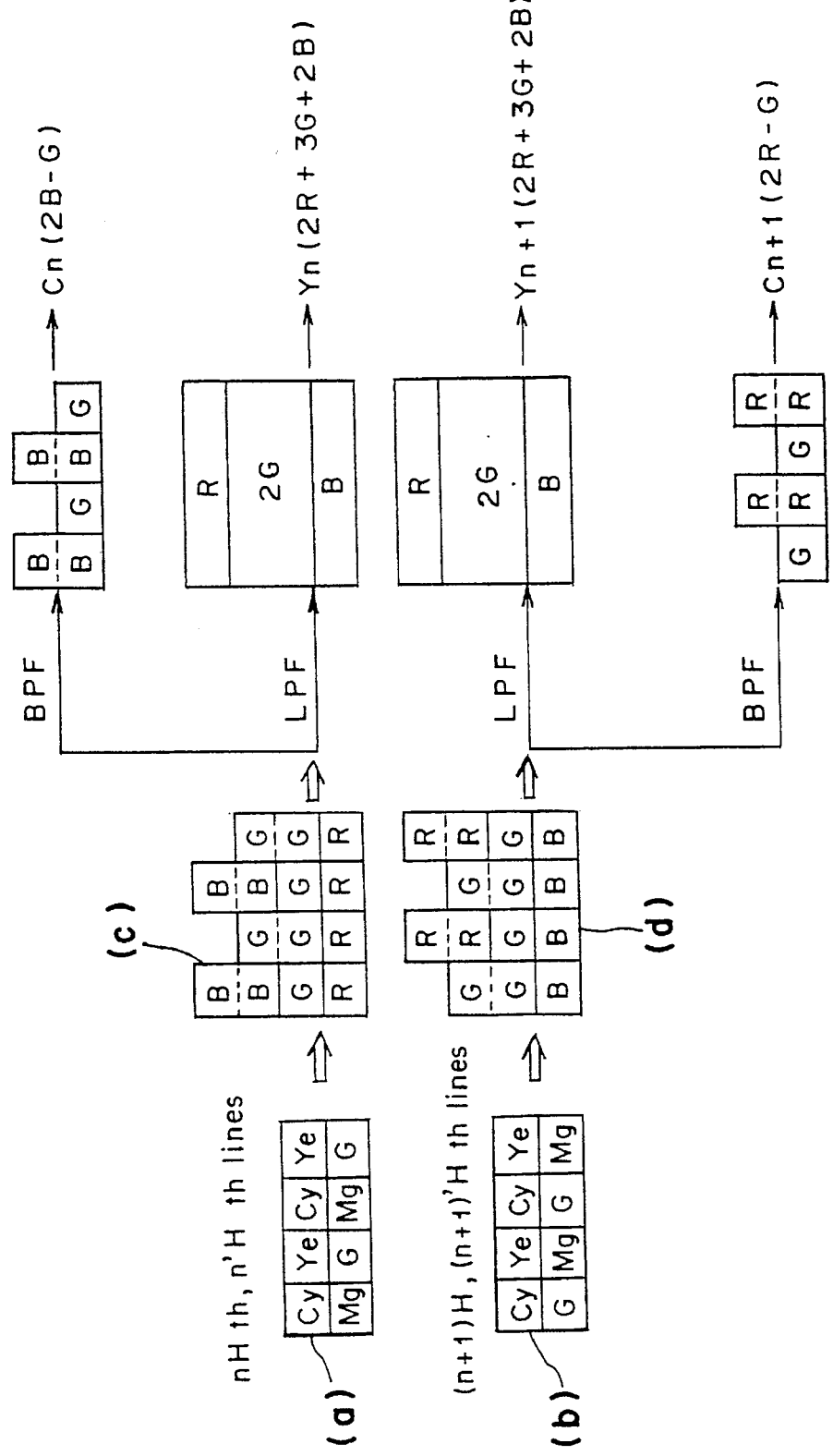
FIG. 10 is a schematic view showing signals obtained from the color image sensor to which the color filters in FIGS. 8 and 9 are provided.

In FIG. 8, when the nH th line of the odd field or the n'H th line of the even field is scanned, a signal that varies for each pixel, as shown by elements (a) and (c) in FIG. 10, is output from the color image sensor, while when the (n+1)H th line of the odd field or the (n+1)'H th line of the even field is scanned, a signal that varies for each pixel, as shown by elements (b) and (d) in FIG. 10, is output. More specifically, an approximate luminance signal of 2R+3G+ 2B as a low-band signal and a color difference signal of 2B −G as a high-frequency modulation signal are obtained from the nH th line or n'H th line, while an approximate luminance signal of 2R+3G+2B as a low-band signal and a color difference signal of 2R−G as a high-frequency modulation signal are obtained from the (n+1)H th line or (n+1)'H th line. Accordingly, the processing for luminance signal separation is principally carried out by making the signal pass through a low-pass filter. On the other hand, the processing for chrominance signal separation is principally effected by making a signal from the color image sensor pass through a band-pass filter or by subtraction-processing the signal for each pixel to separate it into two types of color difference signals and further concurrence-processing line-sequential color difference signals using the 1H delay circuit or (1H+1H) delay circuit.

In consequence, with the arrangement as shown in FIG. 7, it is possible to share the 1H delay circuit necessary for color separation (concurrence-processing of line-sequential signals) and the 1H delay circuit necessary for vertical aperture correction (1H delay of luminance signals and generation of vertical aperture correction signals), thus contributing to the simplification of the circuitry. Moreover, the level of vertical aperture correction with luminance signals is adaptively controlled according to the interpolation weight coefficient w as in the first embodiment and other embodiments, and thus, the differences in the vertical frequency response between lines, as would be involved in interpolation processing in the prior art, can be corrected.

Although the first and second apparatus of the present invention have been described above taking the case of an image pickup apparatus provided with image enlargement function (electronic zoom function) through horizontal line interpolation, it is apparent that the present invention can comprehensibly be applied to the general horizontal line interpolation circuits without limiting it to image pickup apparatus such as described above. For such wider applications, the image sensor 1 and the driving circuit 2 in FIG. 1 and FIG. 6 are omitted and the amplifier 3 has an image signal directly input thereto, and the process circuit 4 may also be omitted if unnecessary.

Further, although the present invention has been described using a primary interpolation as the horizontal line interpolation method (a method that the mid-point line is obtained out of two adjoining lines, the Sn th and (Sn+1) th line by a calculation of wSn+(1−w) Sn+1), the interpolation method is not necessarily limited thereto and the present invention can apparently be achieved by any such method if the level of vertical aperture correction is controlled with interpolation weight coefficients according to the method.

Figure 11:
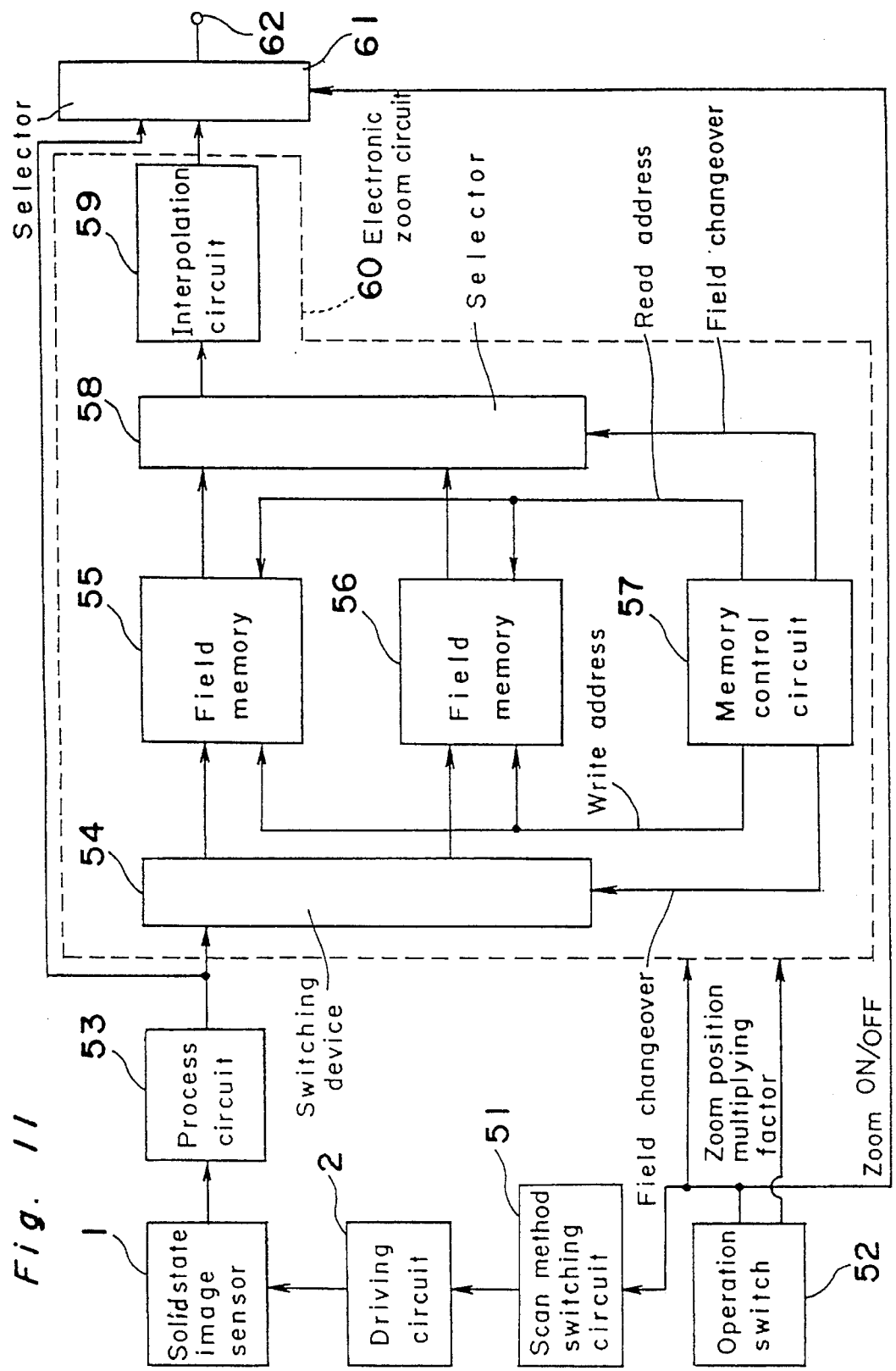
FIG. 11 is a block diagram showing the construction of the image pickup apparatus of a first embodiment of a third apparatus of the present invention.

FIG. 11 is a block diagram of an image pickup apparatus showing a first embodiment of the third apparatus of the present invention. In the figure, reference numeral 1 denotes a solid state image sensor; numeral 2 denotes a driving circuit for the solid state image sensor 1; numeral 51 denotes a scan method switching circuit, which is controlled by an electronic zoom on/off control signal from an operation switch 52. The operation switch 52 gives instructions for on/off control of the electronic zoom as well as the zoom multiplying factor and screen position to be zoomed (zoom position) for on-control of the electronic zoom. Numeral 53 denotes a process circuit for generating luminance signals and chrominance signals from the solid state image sensor 1; numeral 60 denotes an electronic zoom circuit for enlargement-processing an output signal from the process circuit 53, the electronic zoom circuit generally comprising: field memories 55 and 56; a switching device 54 for selecting either one of the field memories 55 and 56 depending on which field it is, to write a signal; a memory control circuit 57 for outputting write and read addresses for the field memories 55 and 56; a selector 58 for selecting either one of the field memories 55 and 56 that is not under write operation depending on which field it is, to read a signal; and an interpolation circuit 59 for performing interpolation. Designated by numeral 61 is a selector for changing over between an electronically zoomed output of an electronic zoom circuit 60 and a non-zoomed output of the process circuit 53 in accordance with an instruction from the operation switch 52, the selector 61 serving to feed a signal to an output terminal 62.

Figure 32:
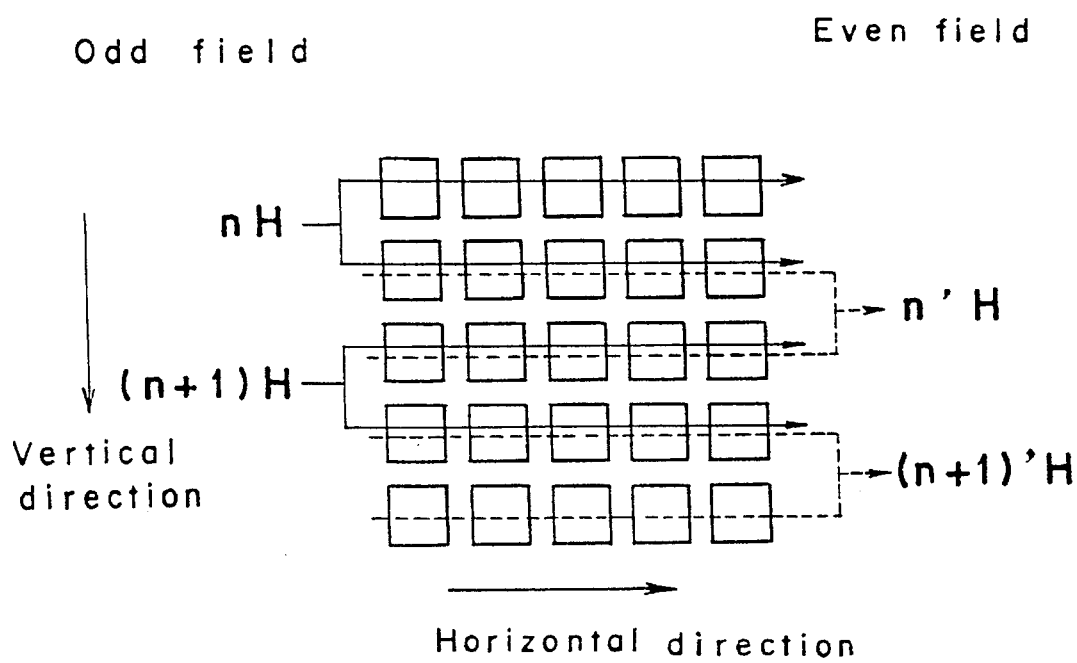
FIG. 32 is a schematic view for explaining scan methods of solid state image sensors used in the conventional image pickup apparatus and in the image pickup apparatus of the present invention.
Figure 33B:
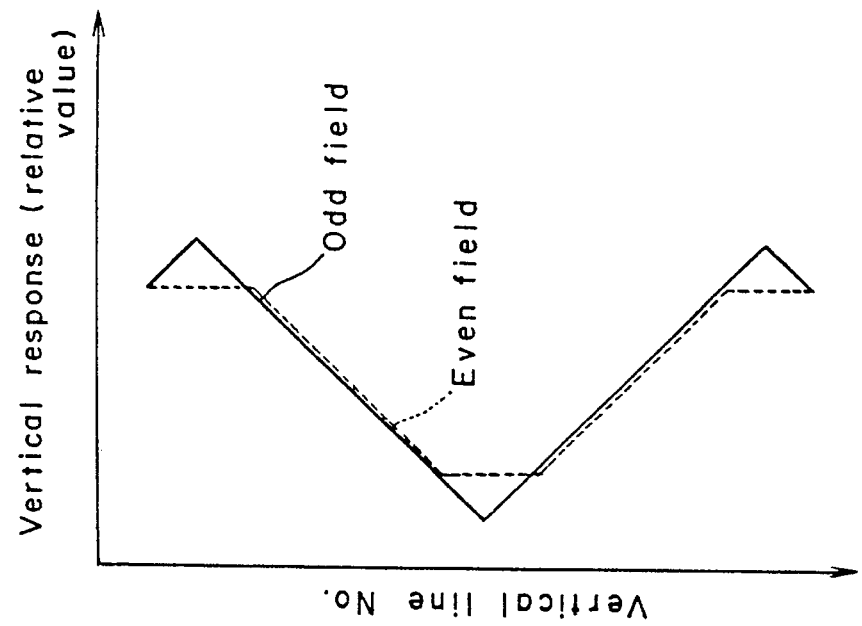
FIGS. 33 (a)–33 (b) are views schematically showing the horizontal line interpolation of the conventional image pickup apparatus and showing vertical responses of lines.
Figure 33A:
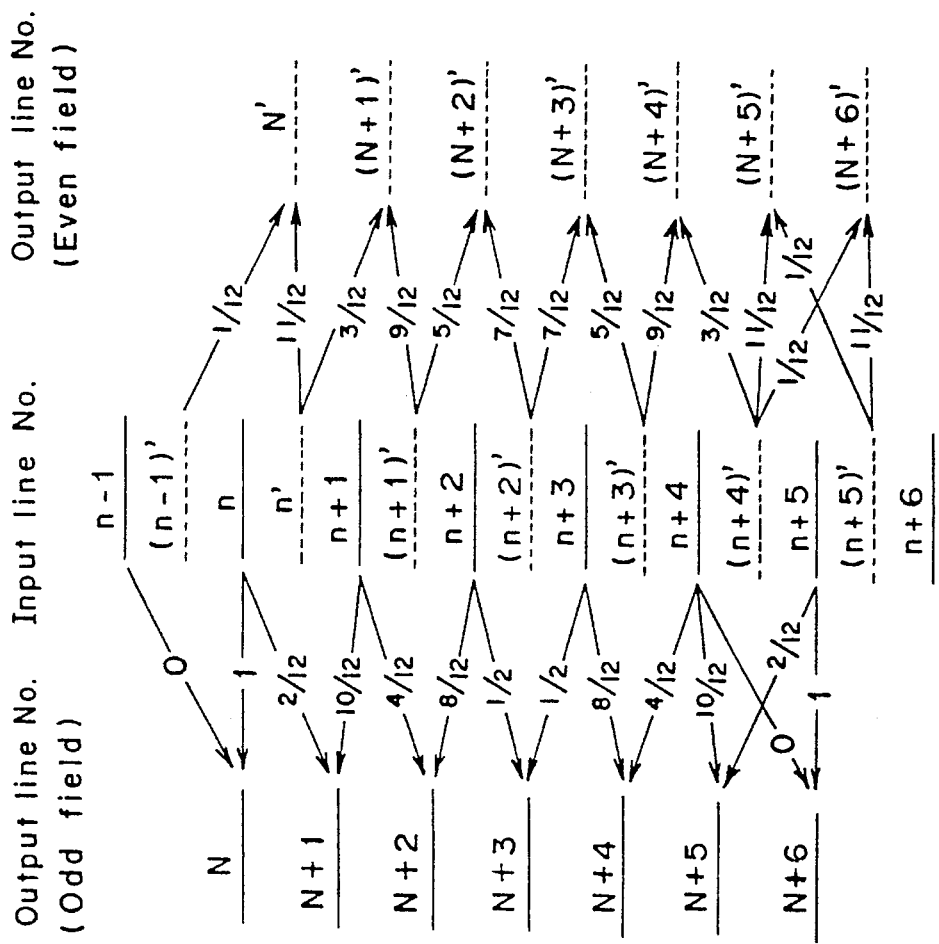
Figure 34A:
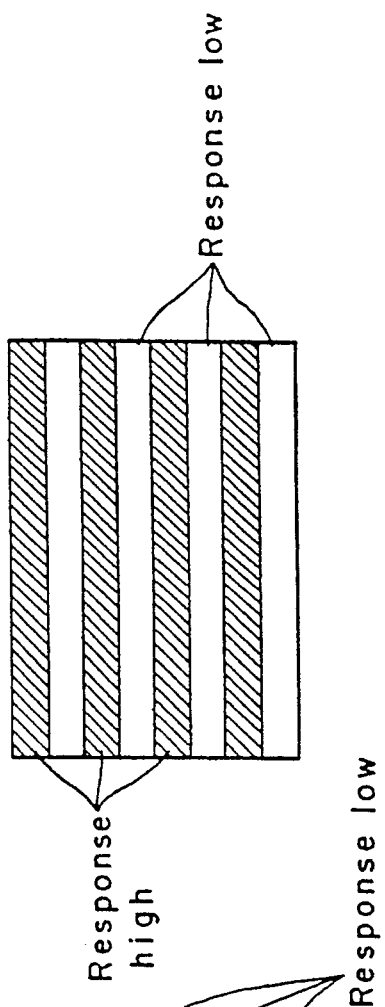
FIGS. 34 (a)–34 (b) are views schematically showing the distribution of high and low vertical responses of an image obtained by electronic zoom operation by horizontal line interpolation in the conventional image pickup apparatus.
Figure 34B:
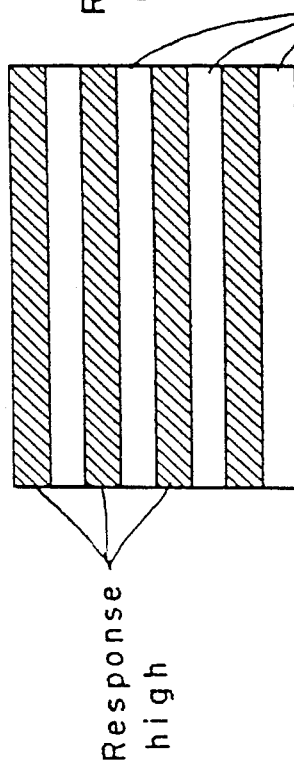

When the instruction from the operation switch 52 is for turning off the electronic zoom operation, the selector 61 selects a signal from the process circuit 53 according to this control signal to feed a non-zoomed signal to the output terminal 62, while this control signal is also led to the scan method switching circuit 51, controlling so as to scan the solid state image sensor 1 by the same method as in the prior art as shown in FIG. 32 (scan method 1). As a result, the signal fed to the output terminal 62 is two-field signals in an interlaced relationship. In addition, if the electronic zoom turn off signal is led also input to the electronic zoom circuit 60 so as to thereby stop the operation of the electronic zoom circuit 60, there are produced effects in power saving or the like.

Figure 12:
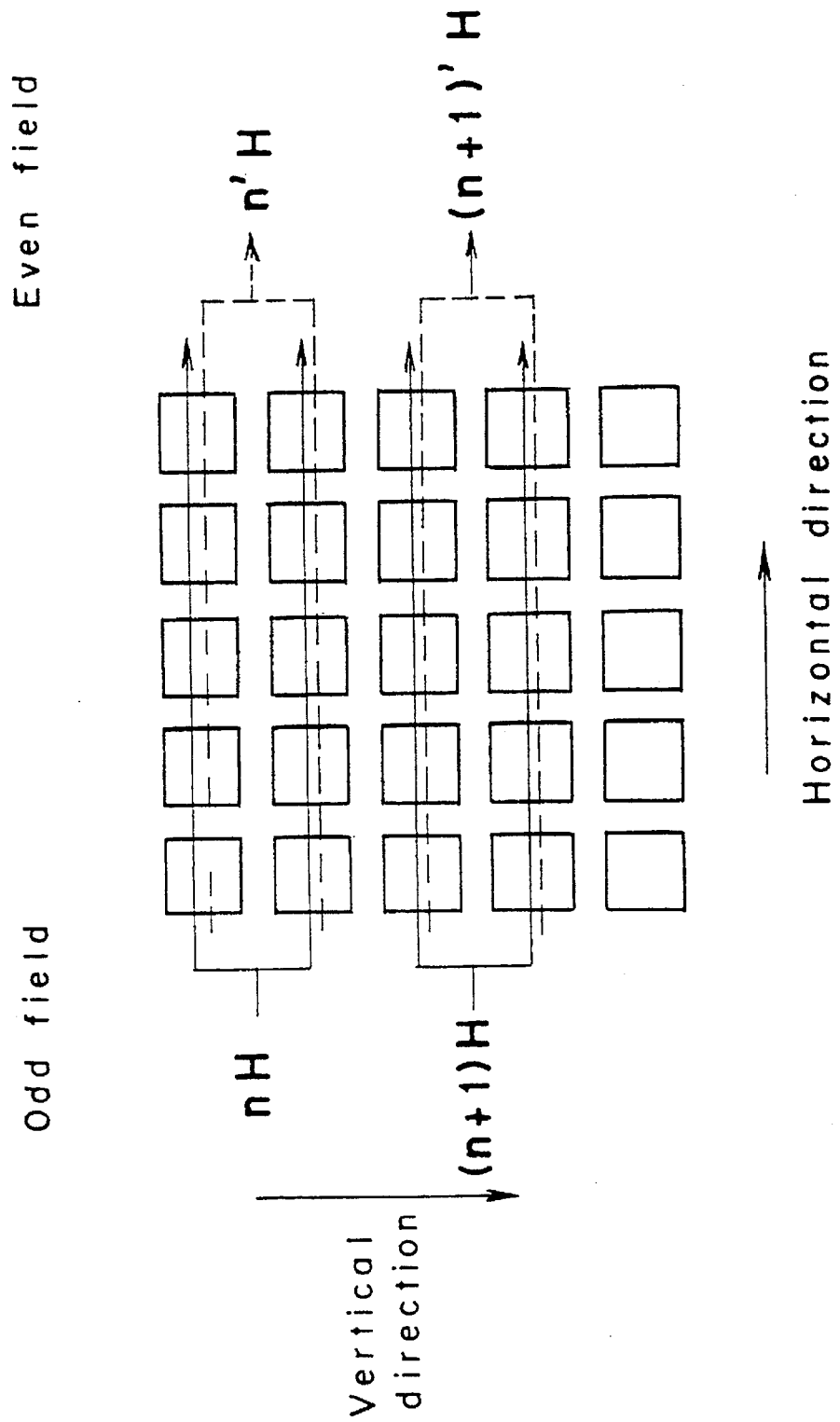
FIG. 12 is a schematic view for explaining the scan format of the solid state image sensor in the first embodiment of the third apparatus of the present invention.

When the instruction from the operation switch 52 is the electronic zoom turn on control signal, the selector 61 selects a signal from the electronic zoom circuit 60 to feed an electronically zoomed signal to the output terminal 62 according to the control signal, while the control signal is also input to the scan method switching circuit 51, controlling so as to scan the solid state image sensor 1 by the method as shown in FIG. 12. This scan method is one in which signal charges of pixels of the solid state image sensor are scanned in such a way that the same pair of adjoining two horizontal pixel rows are scanned by one-time horizontal scan for both the odd and even fields, as shown in FIG. 12 (scan method (2)). Accordingly, the two-field signals, output signals of the solid state image sensor 1 are located at an identical position, as shown in FIG. 13 (a). Incidentally, the scan lines n, (n+1), (n+2), . . . represent scan lines of the odd field, while the scan lines n', (n+1)', (n+2)', . . . represent scan lines of the even field.

Receiving such input signals, the electronic zoom circuit 60 performs the electronic zoom operation as described below.

As in the prior art, the following description is based on the assumption that the solid state image sensor 1 outputs an image of 240 lines for one field, and therefore that of 480 lines for one frame, and that, out of these, a portion corresponding to 200 lines for one field is enlarged so as to obtain a normal one-field image, i.e. a signal of 240 lines.

To increase the number of scan lines from 200 to 240, the electronic zoom circuit 60 in FIG. 11 performs interpolation processing as shown in FIG. 13 (a). That is, for the odd field, odd field output lines are obtained from odd field input lines in the same manner as in the prior art. For example, to obtain the (N+2) th line in the odd field, the (n+1) th and (n+2) th lines are read from the field memory 55 or 56, the readouts being multiplied by interpolation weight coefficients relative to distances (in this case, 4/12 and 8/12) and further added together. Likewise those for other output lines can be obtained by multiplying readouts of upper and lower two lines by interpolation weight coefficients relative to distances and further adding together. On the other hand, for the even field, even field output lines are obtained from even field input lines in FIG. 13 (a) (the same as input of the odd field) through the same interpolation processing, where the processing is carried out so that lines obtained by the interpolation processing are in interlace relation with signals of the odd field, that is, fall just in the intermediate point between adjoining two lines of the odd field. More specifically, to obtain the (N+2)' th line of the even field that is to be positioned just in the intermediate point between the (N+2) th and (N+3) th lines of the odd field, the (n+1)' th and (n+2)' th input lines are read from the field memory 55 or 56 and the readouts are multiplied by the interpolation weight coefficients (in this case, 11/12 and 1/12) relative to distances of the intermediate point between the (N+2) th line and the (N+3) th line of the odd field and further added together. Similarly, to obtain other output lines of the even field, readouts of upper and lower two lines are multiplied by interpolation weight coefficients relative to distances so as to make the results fall just in the intermediate point between adjoining two lines of the odd field, and further added together.

The vertical frequency response characteristic of the output signal interpolation-processed as above is such that, as in the prior art, a line interpolated with interpolation weight coefficients of ½ and ½ results in the perfect average of input two lines, causing the vertical frequency response characteristic to be the lowest, while a line interpolated with interpolation weight coefficients of 1 and 0 allows one line of input 0 to be output as it is, causing the frequency response characteristic to be the highest, whereas the interpolation weight coefficients of adjoining lines between the odd and even fields are not equal and therefore, for example, when lines of the odd field are interpolated with the interpolation weight coefficients of approximately ½ and ½, adjoining lines of the even field are interpolated with the interpolation weight coefficients of approximately 1 and 0 (e.g. the (N+3) th line of the odd field (interpolation weight coefficients: ½ and ½) and the (N+3)' th line of the even field (interpolation weight coefficients: 1/12 and 11/12)), thus resulting in approximately reversed positions of high and low lines in vertical frequency response between the odd and even fields. This aspect is shown in FIG. 13 (b). In the figure, solid line represents vertical frequency response characteristic of the odd field, and dotted line does that of each output line of the even field.

Figure 14B:
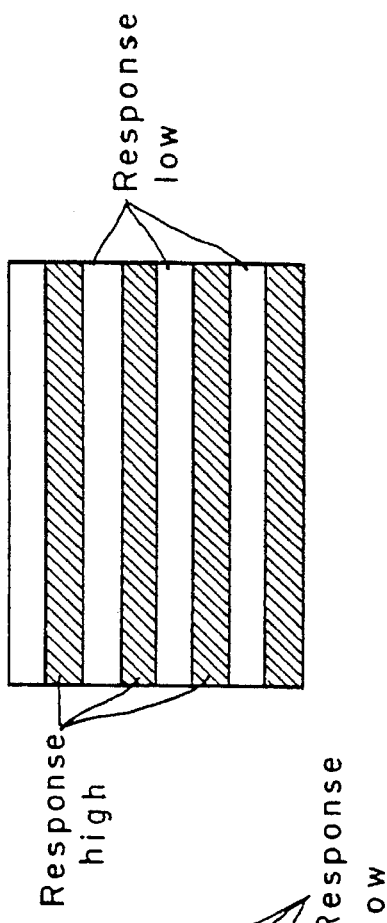
FIGS. 14 (a)–14 (b) are schematic views showing the distribution of high and low vertical responses of an image obtained by the electronic zoom operation in the first embodiment of the third apparatus of the present invention.
Figure 14A:
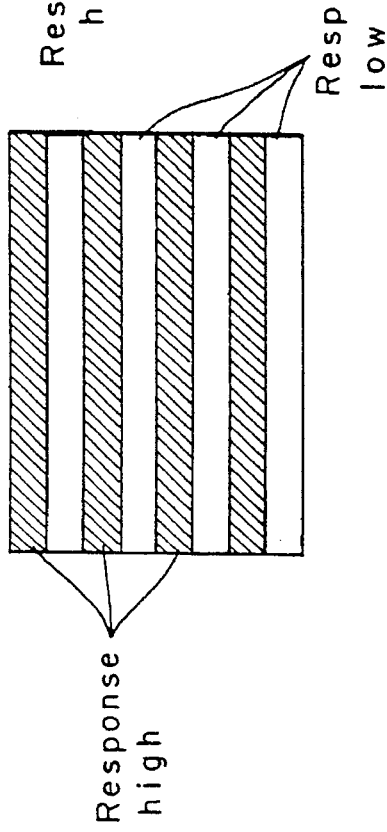

As described above, according to the present invention, the positions of high and low lines in vertical frequency response are approximately reversed between the odd and even fields, with the result that the vertical frequency response of the even field becomes high at a screen position having a low vertical frequency response in the odd field, as shown in FIGS. 14 (a)–14 (b). Thus, the resulting one-frame image in which these two field screens are synthesized is approximately uniform in vertical frequency response over the entire screen.

Figure 15:
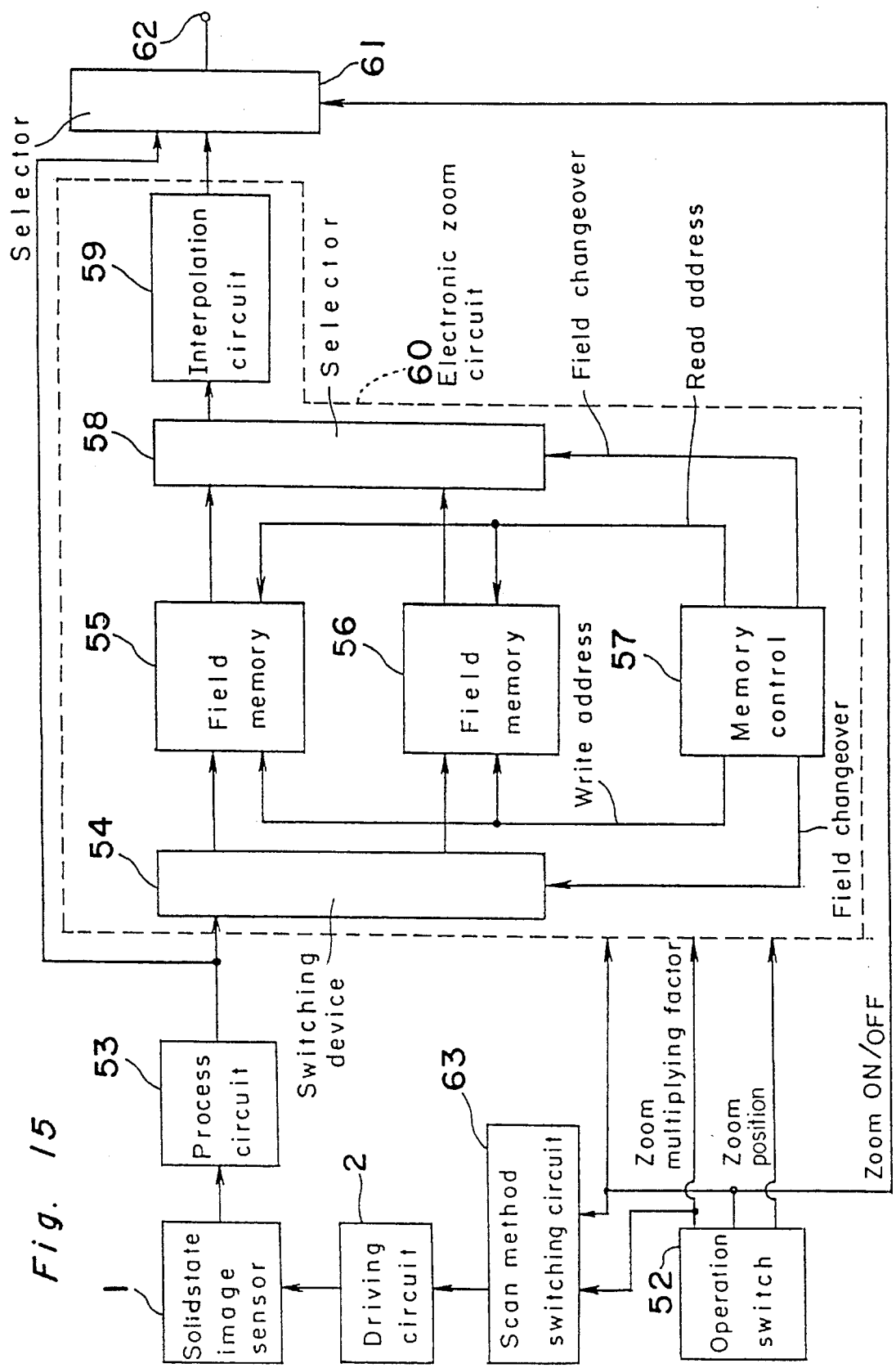
FIG. 15 is a block diagram showing the construction of the image pickup apparatus of a second embodiment of the third apparatus of the present invention.

FIG. 15 is a block diagram of an image pickup apparatus showing a second embodiment of the third apparatus of the present invention. Its difference from the first embodiment of FIG. 11 exists in that while the scan method of the solid state image sensor 1 is switched only with the on/off control signal of electronic zoom in the first embodiment, it is instead arranged so that the scan method is switched with the on/off control signal of electronic zoom and the zoom multiplying factor. More specifically, a scan method switching circuit 63 receives an of/off control signal of electronic zoom from the operation switch 52 and a zoom multiplying factor control signal, wherein, only when the electronic zoom control is on and moreover the zoom multiplying factor is over a specified value, the scan method of the solid state image sensor 1 is switched to the second scan method, so that the electronic zoom circuit 60 performs interpolation processing according to the scan method. The remaining construction and operation are the same as in the first embodiment, and accordingly, a detailed description thereof has been omitted. With the above arrangement, it is possible to eliminate such disadvantages in the first embodiment that, when the electronic zoom multiplying factor is low, the area in the screen having different signal levels between the odd and even fields increases so as to likely cause the flicker phenomenon.

In addition, although the black and white attribute of the solid state image sensor 1 and the variations of color elements or those of construction have not been referred to in the above description for the third apparatus of the present invention, it is apparent that any image sensor may be incorporated in the construction of the present invention if it is capable of being switched between the above-mentioned two scan methods.

Figure 16:
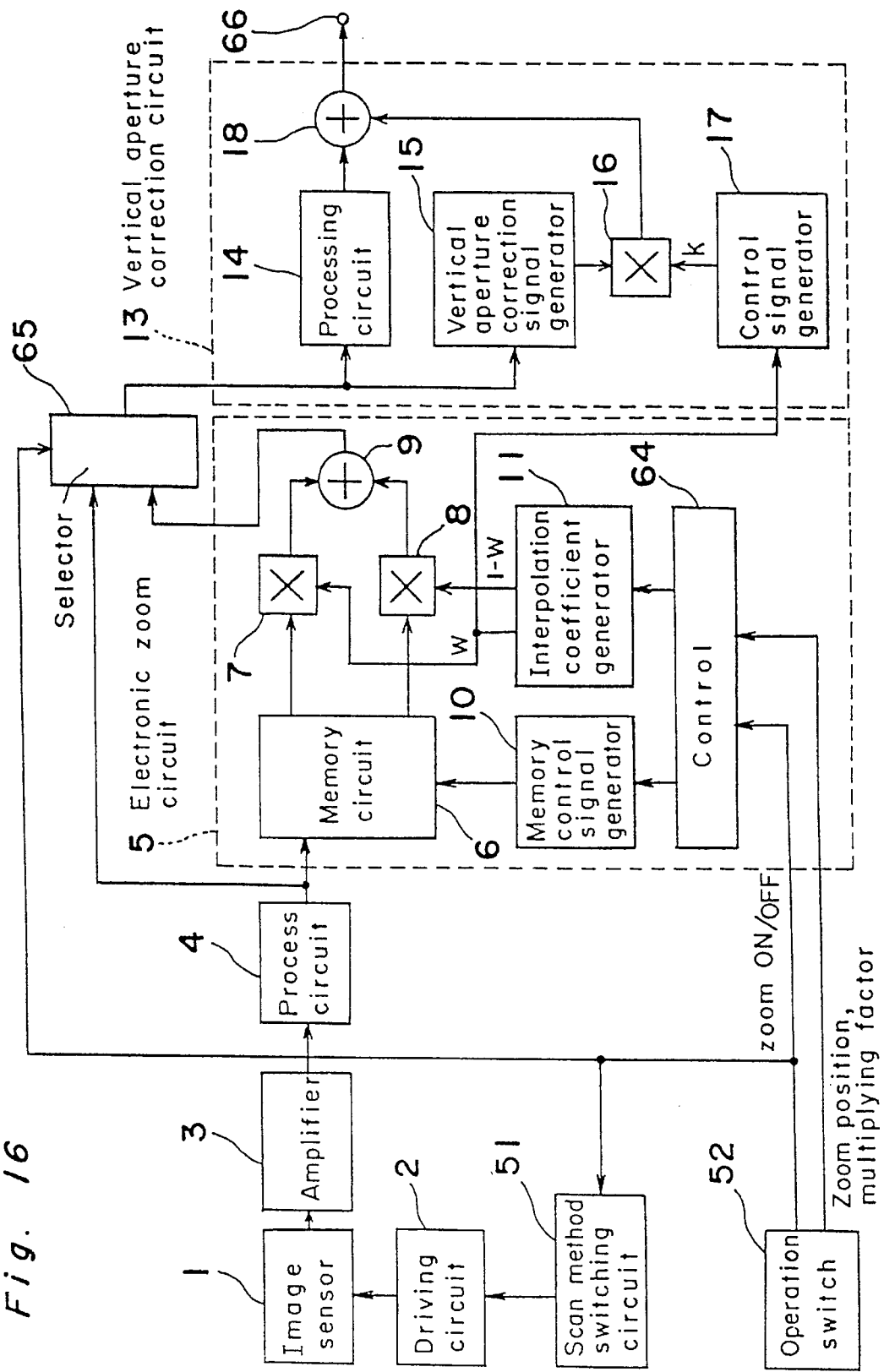
FIG. 16 is a block diagram showing the construction of the image pickup apparatus of a first embodiment of a fourth apparatus of the present invention.

FIG. 16 is a block diagram of an image pickup apparatus showing a first embodiment of the fourth apparatus of the present invention. In the figure, reference numeral 1 denotes a solid state image sensor; numeral 2 denotes a driving circuit for the solid state image sensor 1; and numeral 51 denotes a scan method switching circuit 51 for changing over the scan method of the solid state image sensor 1, which is controlled by the electronic zoom on/off control signal from the operation switch 52. The operation switch 52 gives instructions for on/off control of the electronic zoom as well as the zoom multiplying factor and screen position to be zoomed (zoom position) for on-control of the electronic zoom. Numeral 3 denotes an amplifier for amplifying an output signal from the solid state image sensor 1, and numeral 4 denotes a process (signal processing) circuit for generating luminance signals and others form output of the amplifier 3. Numeral 5 denotes an electronic zoom circuit for enlargement-processing an output signal from the process circuit 4 through horizontal line interpolation, the electronic zoom circuit 5 generally comprising: a memory circuit 6; a memory control signal generator 10 for generating control signals for write, read, and addresses of the memory circuit 6; multipliers 7 and 8 for multiplying signals of two lines read from the memory circuit 6 by their respective interpolation weight coefficients w and (1−w); a first adder 9 for adding up output signals of the multipliers 7 and 8 to yield interpolation output; and an interpolation coefficient generator 11 for generating the interpolation weight coefficients w and (1−w) for signals of two lines in compliance with instructions from a control section 64. The control section 64 generates control signals to the memory control signal generator 10 and the interpolation coefficient generator 11 according to the zoom multiplying factor of the electronic zoom and the screen position to be zoomed (zoom position). Numeral 65 denotes a selector for switching between an electronically zoomed output of the electronic zoom circuit 5 and a non-zoomed output of the process circuit 4 in accordance with instructions from the operation switch 52, which selector feeds a signal to a vertical aperture correction circuit 13. Numeral 13 denotes a vertical aperture correction circuit for performing vertical aperture correction of an output image signal of the selector 65, the output of the circuit being fed to an output terminal 66. The vertical aperture correction circuit 13 comprises: a vertical aperture correction signal generator 15 for generating a vertical aperture correction signal out of a signal from the selector 65; a control signal generator 17 for generating a control signal k according to the interpolation coefficient w of the electronic zoom circuit 5; a third multiplier 16 for controlling the level of a vertical aperture correction signal according to the control signal k; a process circuit 14 for performing delay processing and the like to a signal from the selector 65; and a second adder 18 for adding a signal from the process circuit 14 and a signal from the third multiplier 16 so as to thereby obtain an image signal having been controlled for the level of vertical aperture correction according to the interpolation coefficient w of the electronic zoom circuit 5.

When the instruction from the operation switch 52 is to turn off the electronic zoom operation, the selector 65 selects a signal from the process circuit 4 to feed a non-zoomed signal to the vertical aperture correction circuit 13 according to the control signal, while the control signal is also input to the scan method switching circuit 51, controlling so as to scan the solid state image sensor 1 by the same method as in the prior art shown in FIG. 32 (a first scan method). As a result, the signal fed to the output terminal 66 is two-field signals in an interlaced relationship. In addition, if the electronic zoom off control signal is also input to the electronic zoom circuit 5 so as to thereby stop the operation of the electronic zoom circuit 5, there are produced effects in power saving or the like.

When the instruction from the operation switch 52 is the electronic zoom on control signal, the selector 65 selects a signal from the electronic zoom circuit 5 to feed an electronically zoomed signal to the output terminal according to the control signal, while the control signal is also input to the scan method switching circuit 51, controlling it so as to scan the solid state image sensor 1 by the method as shown in FIG. 12. This scan method is one in which signal charges of pixels of the solid state image sensor are scanned in such a way that the same pair of adjoining two horizontal pixel rows are scanned by one-time horizontal scan for both the odd and even fields, as shown in FIG. 12 (a second scan method). Accordingly, the two-field signals, an output signal of the solid state image sensor 1 are located at an identical position, as shown in FIG. 13 (a). Incidentally, the scan lines n, (n+1), (n+2), . . . represent scan lines of the odd field, while the scan lines n', (n+1)', (n+2)', . . . represent scan lines of the even field.

Receiving such input signals, the electronic zoom circuit 5 performs the electronic zoom operation as described below. As in the prior art, the following description is based on the assumption that the solid state image sensor 1 outputs an image of 240 lines for one field, and therefore that of 480 lines for one frame, and that, out of these, a portion corresponding to 200 lines for one field is enlarged so as to obtain a normal one-field image, i.e. a signal of 240 lines.

To increase the number of scan lines from 200 to 240, the electronic zoom circuit 5 in FIG. 16 performs interpolation processing as shown in FIG. 13 (a). That is, for the odd field, odd field output lines are obtained from odd field input lines in the same manner as in the prior art. For example, to obtain the (N+2) th line in the odd field, the (n+1) th and (n+2) th lines are read from the memory circuit 6, the readouts being multiplied by interpolation weight coefficients relative to distances (in this case, 4/12 and 8/12) and further added together. Likewise those for other output lines can be obtained by multiplying readouts of upper and lower two lines by interpolation weight coefficients relative to distances and further adding together. On the other hand, for the even field, even field output lines are obtained from even field input lines in FIG. 13 (a) (the same as input of the odd field) through the same interpolation processing, where the processing is carried out so that lines obtained by the interpolation processing are in interlaced relationship with signals of the odd field, that is, fall just in the intermediate point between adjoining two lines of the odd field. More specifically, to obtain the (N+2)' th line of the even field that is to be positioned just in the intermediate point between the (N+2) th and (N+3) th lines of the odd field, the (n+1)' th and (n+2)' th input lines are read from the memory circuit 6 and the readouts are multiplied by the interpolation weight coefficients (in this case, 11/12 and 1/12) relative to distances of the intermediate point between the (N+2) th line and the (N+3) th line of the odd field and further added together. Similarly, to obtain other output lines of the even field, readouts of upper and lower two lines are multiplied by interpolation weight coefficients relative to distances so as to make the results fall just in the intermediate point between adjoining two lines of the odd field, and further added together.

The vertical frequency response characteristic of the output signal interpolation-processed as above is such that, as in the prior art, a line interpolated with interpolation weight coefficients of ½ and ½ results in the perfect average of input two lines, causing the vertical frequency response characteristic to be the lowest, while a line interpolated with interpolation weight coefficients of 1 and 0 allows one line of input 0 to be output as it is, causing the frequency response characteristic to be the highest, whereas the interpolation weight coefficients of adjoining lines between the odd and even fields are not equal and therefore, for example, when lines of the odd field are interpolated with the interpolation weight coefficients of approximately ½ and ½, adjoining lines of the even field are interpolated with the interpolation weight coefficients of approximately 1 and 0 (e.g. the (N+3)' th line of the odd field (interpolation weight coefficients: ½ and ½) and the (N+3)' th line of the even field (interpolation weight coefficients: 1/12 and 11/12), thus resulting in approximately reversed positions of high and low lines in vertical frequency response between the odd and even fields. This aspect is shown in FIG. 13 (b). In the figure, solid line represents vertical frequency response characteristic of the odd field, and dotted line does that of each output line of the even field.

As described above, in the output of the electronic zoom circuit 5, the positions of high and low lines in vertical frequency response are approximately reversed between the odd and even fields, with the result that the vertical frequency response of the even field becomes high at a screen position having a low vertical frequency response in the odd field, as shown in FIGS. 14 (a)–14 (b). Thus, the resulting one-frame image in which these two field screens are synthesized has better uniformity of vertical frequency response over the entire screen.

Subsequently, the output signal of the selector 65 is subjected to vertical aperture correction by the vertical aperture correction circuit 13. The operation is as follows.

The control signal generator 17 forms a control signal k that depends on the interpolation weight coefficient w from the interpolation coefficient generator 11 (the signal takes a value proportional to the coefficient w when the w is less than 0.5 and proportional to that of (1−w) when the w is more than 0.5, as shown in FIG. 2), and then a vertical aperture correction signal generated by the vertical aperture correction signal generator 15 is multiplied by the control signal k in the multiplier 16, thus controlling the level of the vertical aperture correction signal. Subsequently, output of the multiplier 16 is added to a signal of the process circuit 14 (signal not subjected to vertical aperture correction) by the adder 18, so that a signal adaptively controlled in vertical sharpness according to the interpolation weight coefficient w is output. More specifically, lines having smaller coefficients of either of the interpolation weight coefficient w or (1−w), whichever smaller, that is, those having greater vertical frequency responses as described in the section for the prior art are controlled so as to lower the level of vertical aperture correction signals, while lines having greater coefficients of either of the interpolation weight coefficient w or (1−w), Whichever smaller, that is, those having smaller vertical frequency responses as described in the section for the prior art are controlled so as to heighten the level of vertical aperture correction signals. Accordingly, differences in vertical frequency response between lines of an image signal after being electronically zoomed are substantially reduced as shown in the characteristic view of FIG. 3, resulting in an appropriately corrected image, which otherwise would be a most undesirable, unfriendly-to-see image due to the vertical frequency response of the image greatly differing depending on vertical positions of the screen as described for the prior art. In addition, FIG. 3 is a chart showing the vertical responses of lines of an image, similar to that shown in FIG. 30 (b). In FIG. 3, the dotted curve represents the characteristic resulting when vertical aperture adaptive control is not performed, while the solid curve represents the characteristic resulting when the level of vertical aperture correction is adaptively controlled by the vertical aperture correction circuit 13 of the present invention shown in FIG. 16 (controlled according to the interpolation weight coefficient w).

Figure 17:
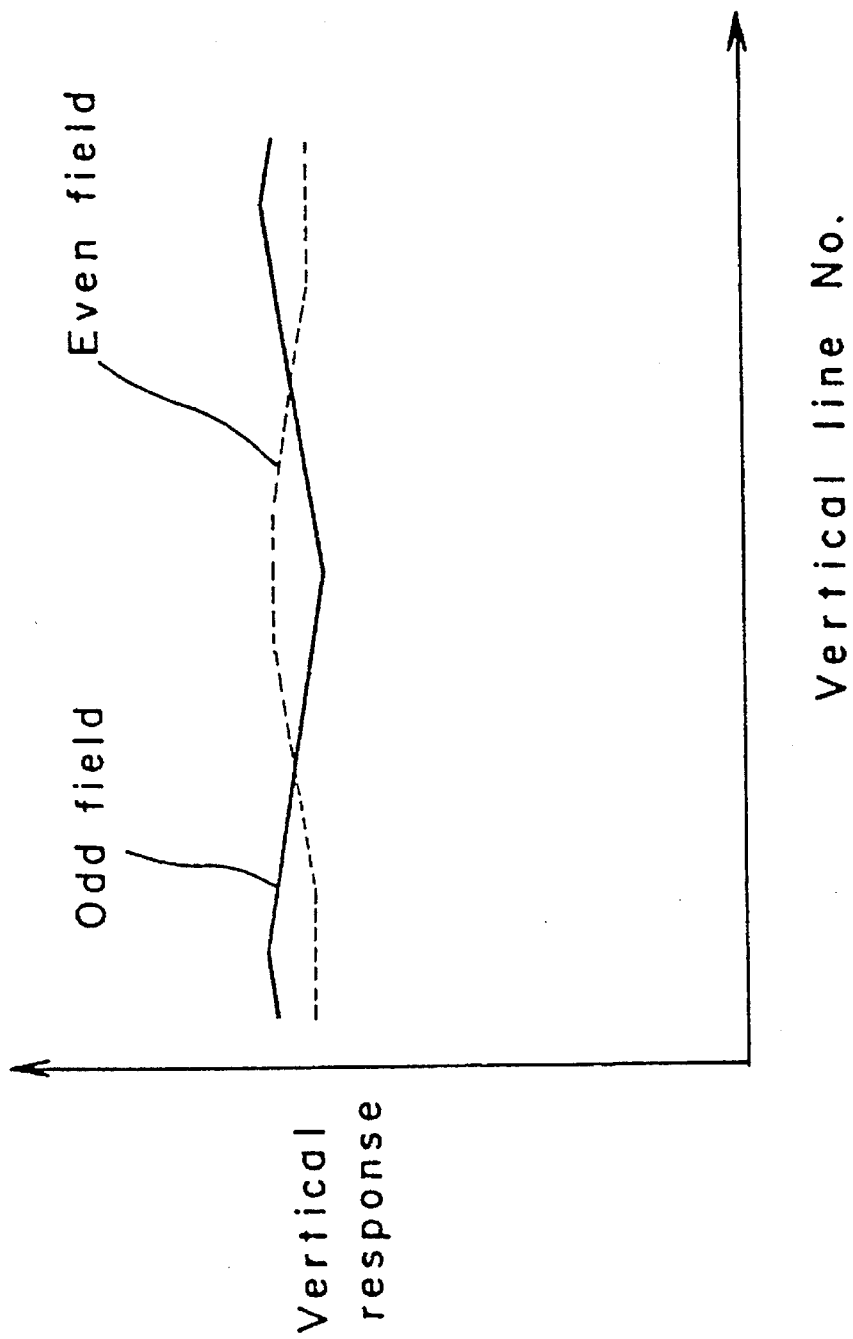
FIG. 17 is a characteristic chart of integrated vertical responses of an image obtained by the electronic zoom operation of the fourth apparatus of the present invention.

In consequence, the electronically zoomed output signal obtained at the output terminal 66 is one in which the characteristic of FIG. 13 (b) and that of FIG. 3 are combined together, resulting in the characteristic as shown in FIG. 17. That is, the vertical frequency response of the even field becomes high at a screen position having a low vertical frequency response in the odd field, and the resulting one-frame image in which these two field screens are synthesized has better uniformity of vertical frequency response over the entire screen. Moreover, differences in vertical frequency response between lines are substantially reduced in each field by the adaptive control of vertical aperture characteristic, thus eliminating the disadvantage of the prior art that the vertical frequency response of an image increases with vertical positions of the screen, resulting in a desirable image.

In addition, as a detailed construction of the vertical aperture correction circuit 13, such one may be arranged as shown in FIG. 4, as in the description for the first and second apparatus of the present invention.

Further, as described above, when the vertical aperture correction circuit 13 is disposed behind the electronic zoom circuit 5 that enlargement-processes an input signal through horizontal line interpolation, there are some advantages: that is, the vertical aperture correction can be effected at a stage at which the number of horizontal lines has been increased by interpolation processing, allowing aperture correction to be effected at higher vertical frequencies with the result of more increased vertical sharpness; the horizontal line of a signal subject to vertical aperture correction and the interpolation weight coefficient w correspond to each other at the ratio one to one (as apparent from FIG. 13 (a), the interpolation weight coefficient w is inherent to output line Nos., not corresponding to input line Nos. at one to one), thus allowing the level of vertical aperture correction to be accurately controlled according to the interpolation weight coefficient w, as in the first and second apparatus of the present invention.

Figure 18:
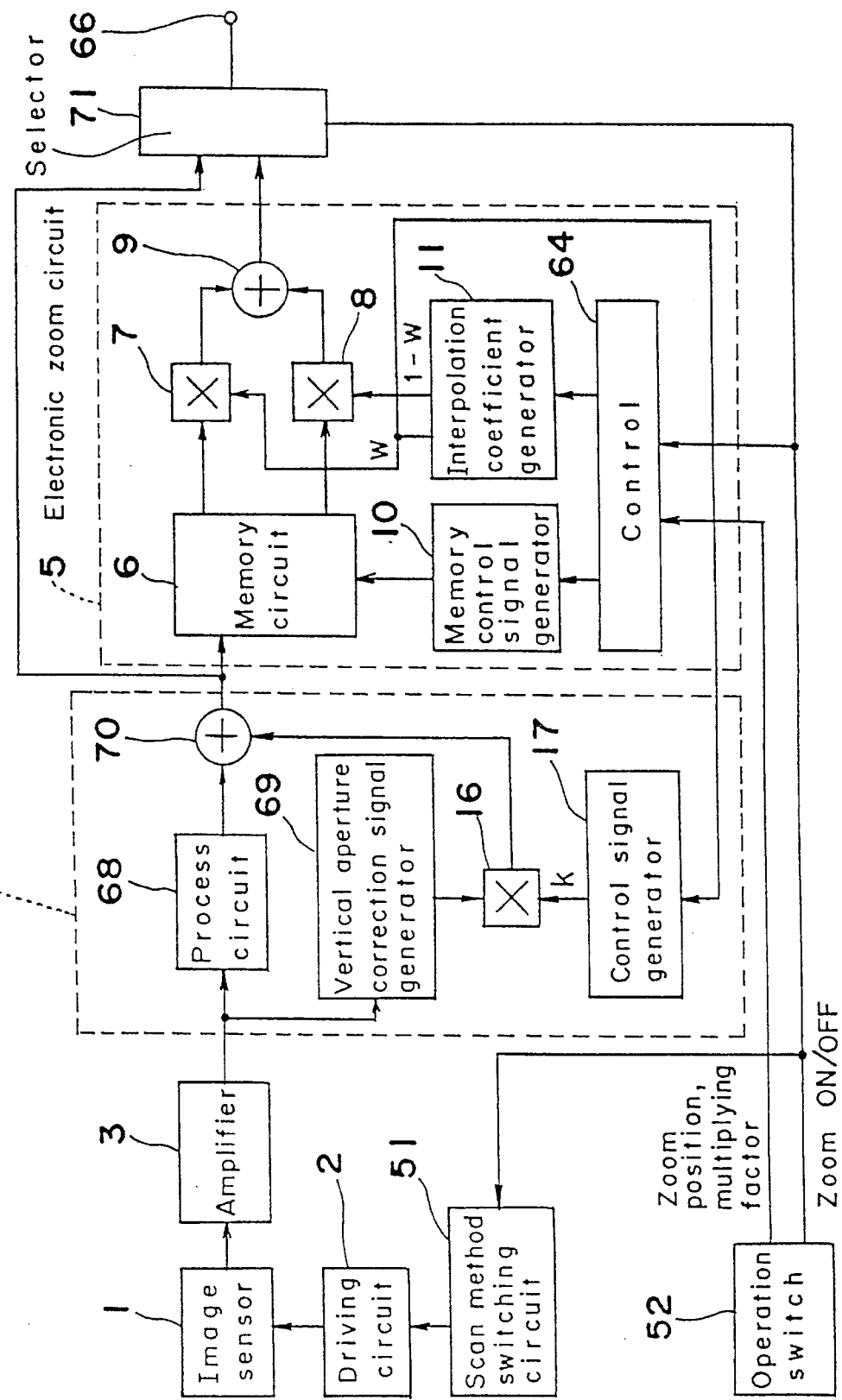
FIG. 18 is a block diagram showing the construction of the image pickup apparatus of the second embodiment of the fourth apparatus of the present invention.

FIG. 18 is a block diagram showing a second embodiment of the fourth apparatus of the present invention. Its difference from the first embodiment of FIG. 16 exists in that a vertical aperture correction circuit 67 is disposed ahead of the electronic zoom circuit 5, while in the embodiment of FIG. 16 the vertical aperture correction circuit 13 is disposed behind the electronic zoom circuit 5 that enlargement-processes an input signal through horizontal line interpolation. The same parts as in FIG. 16 are designated by the same reference numerals, and a detailed description thereof has been omitted.

In FIG. 18, reference numeral 1 denotes a solid state image sensor; numeral 2 denotes a driving circuit for the solid state image sensor 1; numeral 3 denotes an amplifier for amplifying an output signal from the image sensor 1; numeral 68 denotes a process circuit for generating luminance signals and others from output of the amplifier 3; numeral 69 denotes a vertical aperture correction signal generator for generating a vertical aperture correction signal; numeral 17 denotes a control signal generator for generating a control signal k corresponding to the interpolation weight coefficient w of the electronic zoom circuit 5; numeral 16 denotes a third multiplier for controlling the level of a vertical aperture correction signal according to the control signal k; numeral 70 denotes a first adder for adding a luminance signal from the process circuit 68 and a vertical aperture correction signal from the third multiplier 16 so as to thereby obtain a luminance signal that has been corrected in vertical sharpness. Numeral 5 denotes an electronic zoom circuit for enlargement-processing an output signal from the first adder 70 by increasing the number of horizontal lines through interpolation processing, identical to the electronic zoom circuit 5 in the embodiment of FIG. 16.

Figure 19:
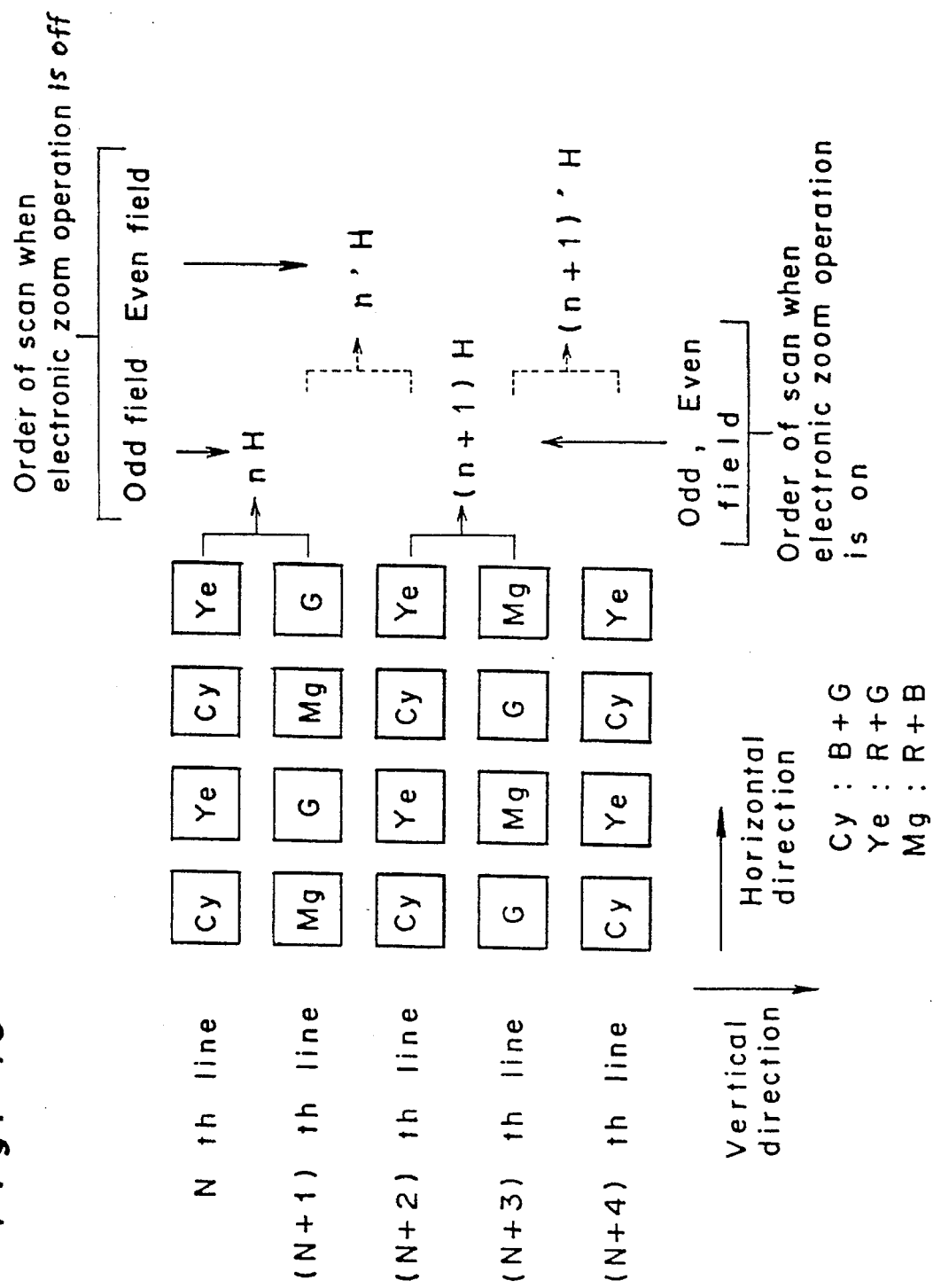
FIG. 19 is a schematic view showing an example of the color filter of the color image sensor used in the image pickup apparatus of the second embodiment of the fourth apparatus of the present invention as well as showing the scan method thereof.

With the above arrangement, by controlling the level of vertical aperture correction according to the interpolation weight coefficient w in the same manner as in the embodiment of FIG. 16, similar effects can be obtained, although not just accurate as in the first embodiment. Moreover, the process circuit 4 and the process circuit 14 in FIG. 16 can be integrated in construction, which allows a simplified construction. As a result, it is advantageously possible to simplify the construction by sharing the circuit components of the process circuit and the vertical aperture correction signal generator. This is the same as in the case of the first and second apparatus of the present invention, and the main-part of its practical construction is the same as in FIG. 7. In addition, in the fourth apparatus of the present invention, since the scan method of the solid state image sensor is switched between the aforementioned first and second scan methods depending on the on/off control of electronic zoom, the construction shown in FIG. 9 is preferable for the color filter of the solid state image sensor. In this case, the scan method is switched as shown in FIG. 19.

Figure 20:
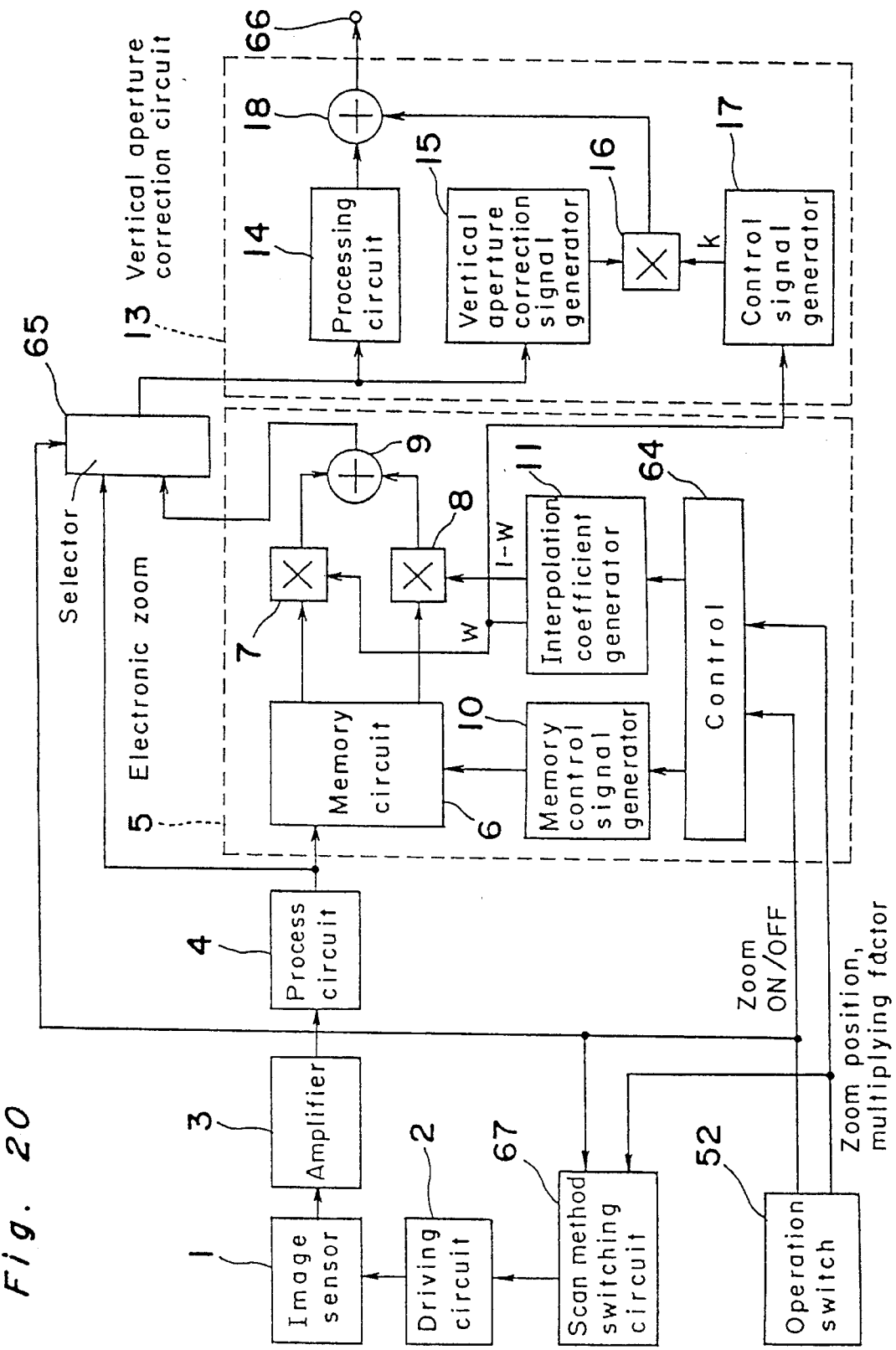
FIG. 20 is a block diagram showing the construction of the image pickup apparatus of a third embodiment of the fourth apparatus of the present invention.
Figure 21:
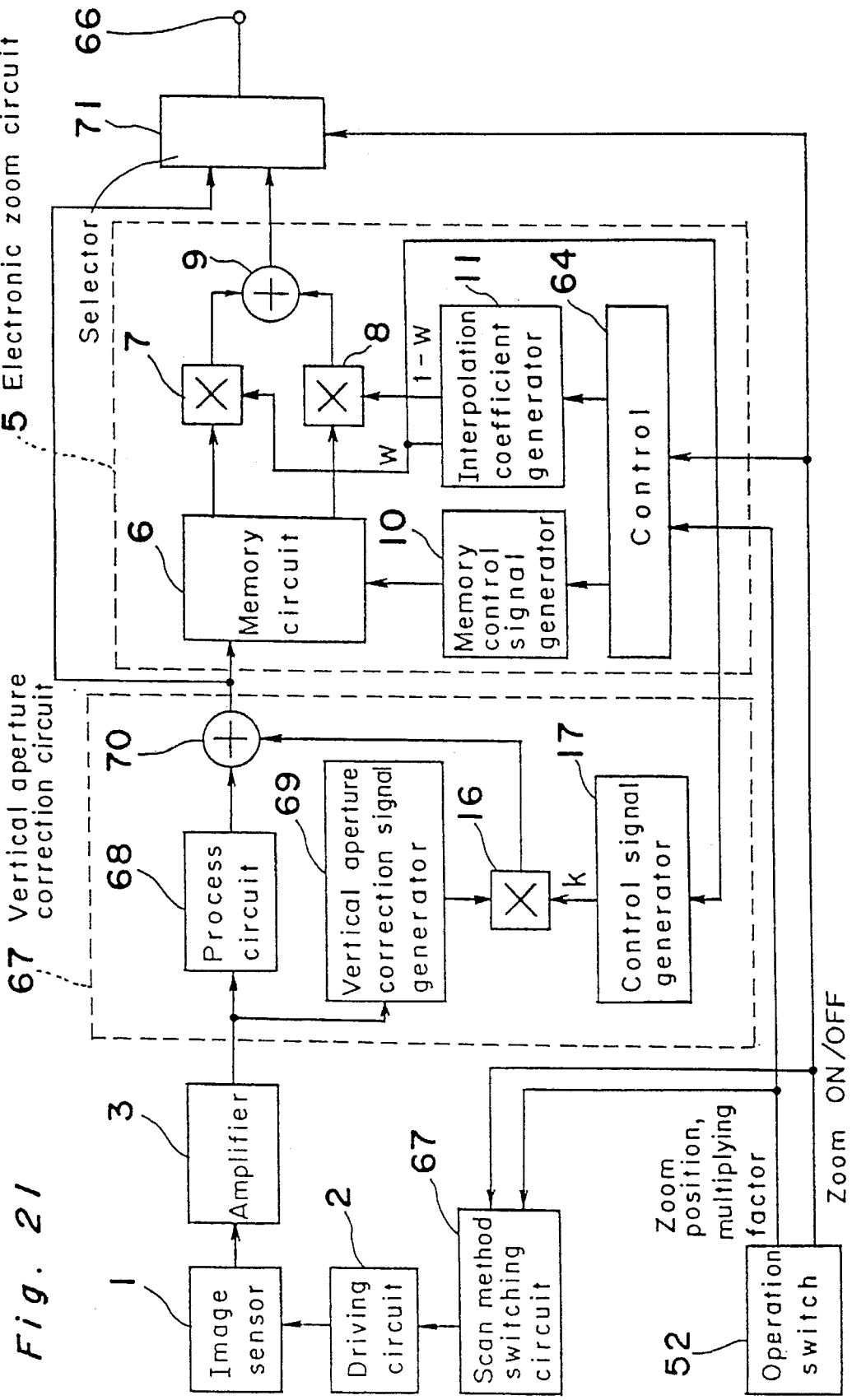
FIG. 21 is a block diagram showing the construction of the image pickup apparatus of a fourth embodiment of the fourth apparatus of the present invention.

FIG. 20 and FIG. 21 are block diagrams of image pickup apparatus showing a third and a fourth embodiment of the fourth apparatus of the present invention, respectively, where FIG. 20 is a variation of the first embodiment of FIG. 16, and FIG. 21 is that of the second embodiment of FIG. 18. The content of the variation is that while the scan method of the solid state image sensor 1 is switched only with the on/off control signal of electronic zoom in the first and second embodiments, it is instead arranged that the scan method is switched with the on/off control signal of electronic zoom and the zoom multiplying factor. More specifically, to a scan method switching circuit 67 there are led an of/off control signal of electronic zoom from the operation switch 52 and a zoom multiplying factor control signal, where, only when the electronic zoom control is on and moreover the zoom multiplying factor is over a specified value, the scan method of the solid state image sensor 1 is switched to the second scan method, so that the electronic zoom circuit 5 performs interpolation processing according to the scan method. The remaining construction and operation are the same as in the first embodiment of FIG. 16 and the second embodiment of FIG. 18, and accordingly, a detailed description thereof has been omitted. With the above arrangement, it is possible to eliminate such disadvantages in the first and second embodiments that, when the electronic zoom multiplying factor is low, the area in the screen having different signal levels between the odd and even fields increases such as to likely cause the flicker phenomenon.

Although the fourth apparatus of the present invention has been described as above using a primary interpolation as the horizontal line interpolation method (a method that the mid-point line is obtained out of two adjoining lines, the Sn th and (Sn+1) th line by a calculation of wSn+(1−w) Sn+1), the interpolation method is not necessarily limited thereto and the present invention can apparently be achieved by any such method if the level of vertical aperture correction is controlled with interpolation weight coefficients according to the method.

Also, although the construction of the solid state image sensor 1 has not been referred to in the above description, it is apparent that any image sensor can be incorporated in construction of the present invention if it is capable of being switched between the above-described two scan methods.

The fifth and sixth apparatus of the present invention are described below with reference to the accompanying drawings, taking the case of an image pickup apparatus with electronic zoom function provided with image enlargement function as an image enlarging apparatus.

Figure 22:
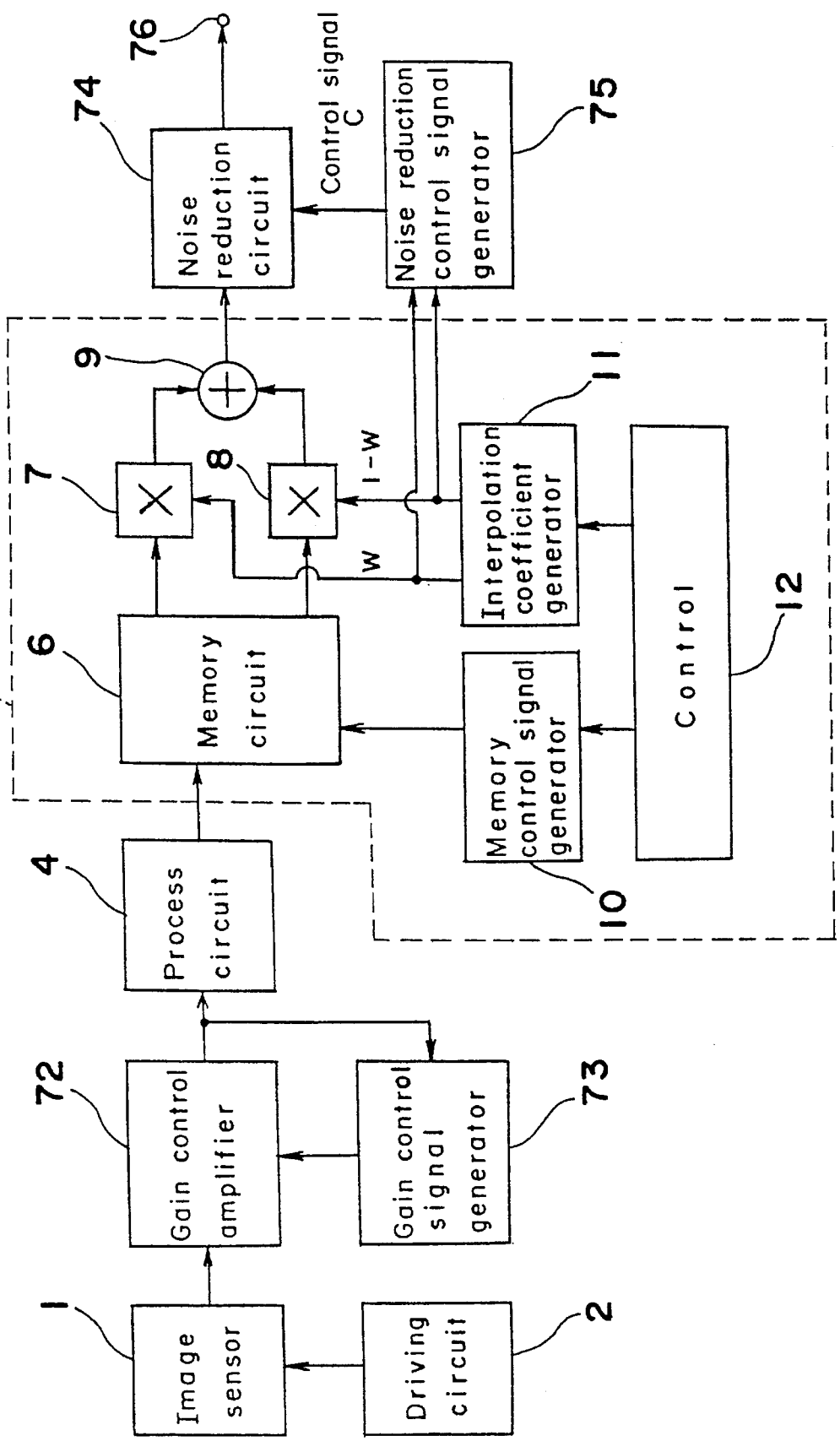
FIG. 22 is a block diagram showing the image pickup apparatus with electronic zoom function of a first embodiment of a fifth and sixth apparatus of the present invention.

FIG. 22 is a block diagram of an image pickup apparatus with electronic zoom function showing a first embodiment of the fifth and sixth apparatus of the present invention. In the figure, reference numeral 1 denotes an image sensor; numeral 2 denotes a driving circuit for the image sensor 1; numeral 72 denotes a gain control amplifier for amplifying an output signal from the image sensor 1; numeral 73 denotes a gain control signal generator for generating a control signal to control the gain of the gain control amplifier 72; and numeral 4 denotes a process circuit for generating luminance signals and others signals from output of the gain control amplifier 72. Numeral 5 denotes an electronic zoom circuit for enlargement-processing an output signal from the process circuit 4, the electronic zoom circuit generally comprising: a memory circuit 6; a memory control signal generator 10 for generating control signals for write, read, and addresses of the memory circuit 6; multipliers 7 and 8 for multiplying signals of two lines read from the memory circuit 6 by their respective interpolation weight coefficients w and (1−w); an adder 9 for adding up output signals of the multipliers 7, 8 to yield interpolation output; and an interpolation coefficient generator 11 for generating the interpolation weight coefficients w and (1−w) for signals of two lines in accordance with instructions from a control section 12. The control section 12 controls the zoom multiplying factor of the electronic zoom and the screen position to be zoomed (zoom position). Numeral 74 denotes a noise reduction circuit for reducing noise of an output image signal of the electronic zoom circuit 5, the output of the noise reduction circuit 74 being fed to an output terminal 76. In addition, the noise reduction circuit 74 is controlled for its reduction characteristic by a control signal C from a noise reduction control signal generator 75, where the noise reduction control signal generator 75 forms a control signal C from the interpolation weight coefficients w and (1−w) derived from the interpolation coefficient generator 11.

Next the operation of the present embodiment is described, in which the operation steps up to the electronic zoom circuit 5 are the same as in the prior art and accordingly, a description thereof has been omitted. The operations of the noise reduction circuit 74 and the noise reduction control signal generator 75 are detailed below.

Figure 25A:
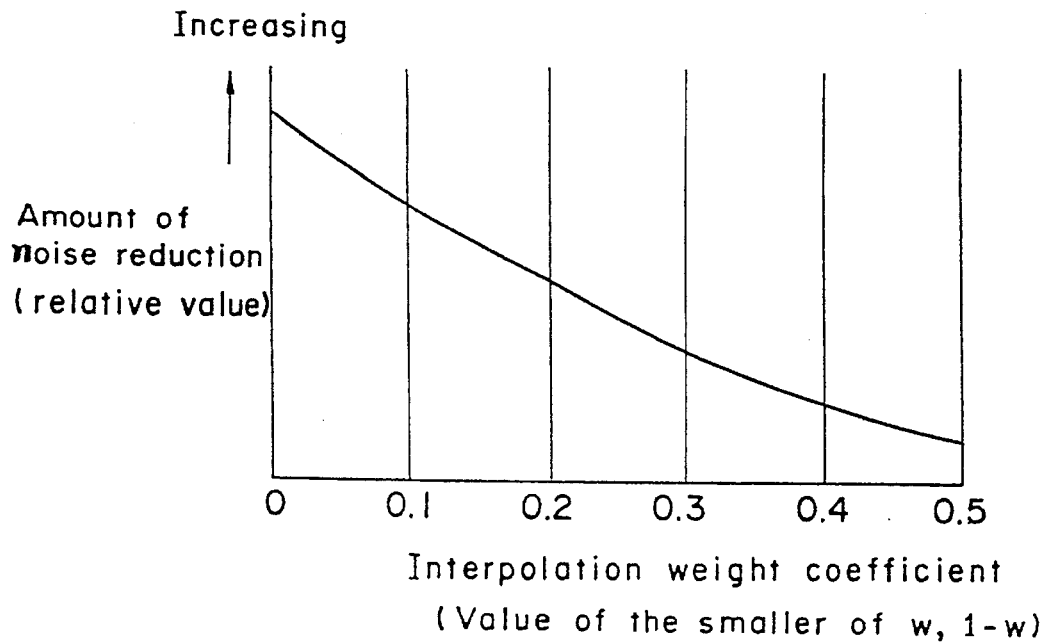
FIGS. 25 (a)–25 (b) are charts showing the noise reduction characteristic of the noise reduction circuit in an embodiment of the fifth and sixth apparatus of the present invention.
Figure 25B:
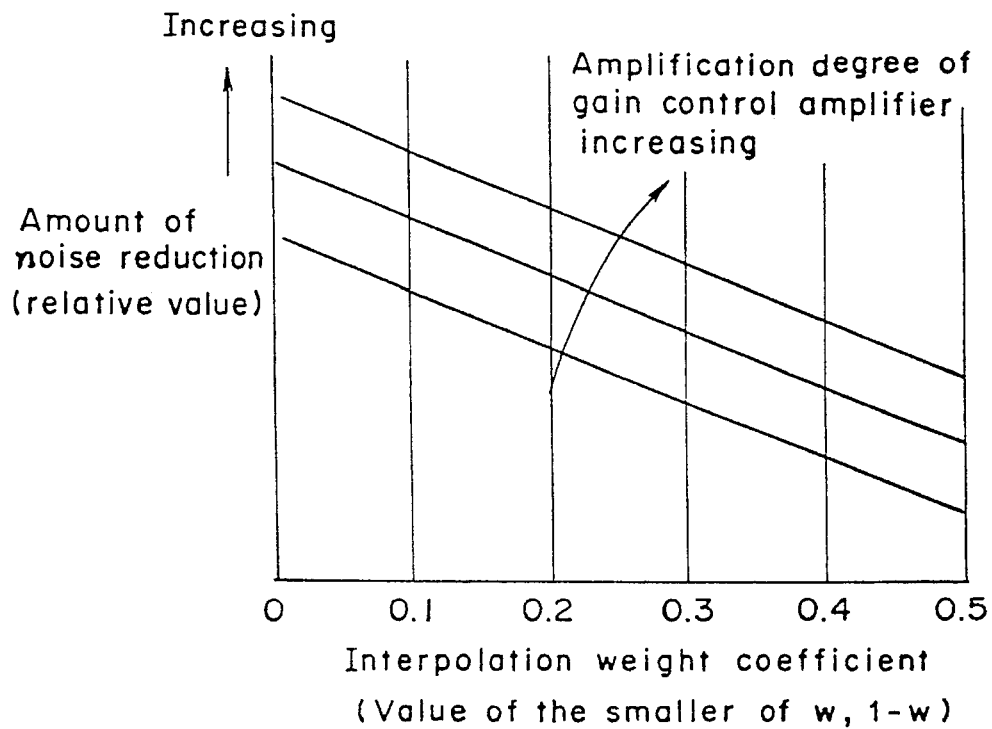
Figure 26:
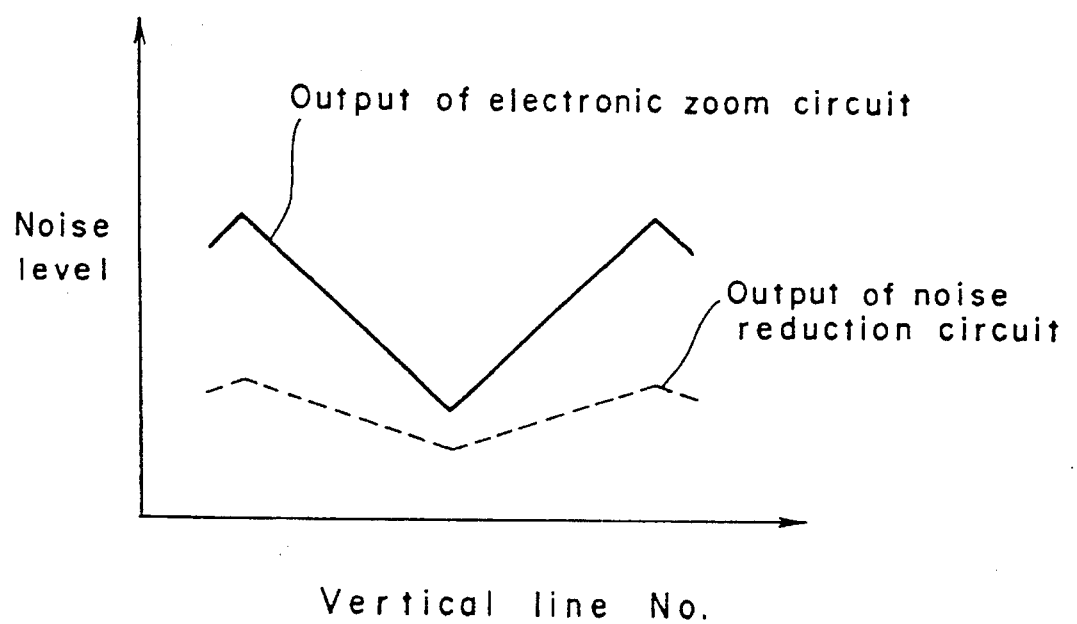
FIG. 26 is a characteristic chart showing the noise level of lines of an image obtained by electronic zoom operation in an embodiment of the fifth and sixth apparatus of the present invention.

The noise reduction control signal generator 75 forms a control signal C corresponding to either of the interpolation weight coefficients w and (1−w) from the interpolation coefficient generator circuit 11, whichever smaller (resulting in a smaller value of the signal for a smaller coefficient, a greater value for greater coefficient). When the control signal C is a smaller one, the noise reduction circuit 74 is controlled so as to give a greater amount of noise reduction, and when the control signal C is a greater one, it is controlled so as to give a smaller amount of noise reduction. Accordingly, the noise reduction characteristic depending on the smaller of the interpolation weight coefficients w and (1−w) results in such one as shown in FIG. 25 (*a*). It is shown here that lines having smaller coefficients of the smaller one of the interpolation weight coefficients w and (1−w), i.e. lines having greater noise levels as described for the prior art are reduced in noise, while lines having greater coefficients of the smaller one of the interpolation weight coefficients w and (1−w), i.e. lines having smaller noise levels as described for the prior art are less reduced in noise. As a result, differences in noise level between lines of an electronically zoomed image signal are reduced as shown in FIG. 26, thus suppressing disturbing lateral stripes due to noise differences between lines as described for the prior art. In addition, FIG. 26 is a chart showing the noise level characteristic of each line, similar to that of FIG. 35 (*c*), where solid line represents the output (i.e. before noise reduction) characteristic of the electronic zoom circuit and dotted line does the characteristic after noise reduction. Although the above-described first embodiment is arranged so that the noise reduction characteristic of the noise reduction circuit 74 is controlled depending on the interpolation weight coefficient w and (1−w) from the interpolation coefficient generator 11, it may otherwise be arranged so as to make all the lines uniformly subjected to noise reduction, in which the S/N ratio over the entire screen is also improved such as to suppress the afore-noted disturbing lateral stripes due to noise differences between lines.

Practical embodiment of the noise reduction circuit 74 shown in FIGS. 23 (*a*)–23 (*b*). FIG. 23 (*a*) shows a so-called line noise cancel circuit, which serves to reduce noise depending on the fact that an image signal has a great correlation between lines. The noise cancel circuit extracts approximately only noise components out of a zoom-processed image signal entered into an input terminal 77 by a 1 horizontal-scan-period delay circuit 78 (hereinafter, referred to as 1H delay circuit), a subtracter circuit 79 and a limiter 80, the resulting output being amplified by an inverting amplifier 81 and added to the input image signal by an adder circuit 82, thus feeding the noise-reduced output to an output terminal 83. Moreover, amplification degree of the inverting amplifier 81 is controlled by the control signal C from the noise reduction control signal generator 75, thus controlling the noise reduction characteristic depending on the interpolation characteristic of electronic zoom.

FIG. 23 (*b*) shows another example of the noise reduction circuit, which reduces noise depending on the fact that noise of an image signal is concentrated in high-frequency range. The circuit extracts high-frequency components containing more noise components out of a zoom-processed image signal entered into the input terminal 77 by a high-pass filter (HPF) 84, and the high-frequency components are made to pass through a limiter circuit 85, thus extracting approximate only noise components. Then, the output is amplified by an inverting amplifier 86 and added to the input image signal by an adder circuit 87, thus feeding a noise-reduced output to the output terminal 83. Moreover, amplification degree of the inverting amplifier 86 is controlled by the control signal C from the noise reduction control signal generator 75, controlling the noise reduction characteristic depending on the interpolation characteristic of electronic zoom.

Although the above-described noise reduction circuit is arranged so that noise reduction characteristic is controlled depending on interpolation characteristic of electronic zoom by controlling the degree of amplification of the inverting amplifiers 81 and 86 with the control signal C from the noise reduction control signal generator 75, it is also possible as another embodiment that noise reduction characteristic is controlled depending on interpolation characteristic of electronic zoom by controlling the limiter characteristic of the limiter circuits 80 and 85 with the control signal C from the noise reduction control signal generator circuit 75.

Figure 24:
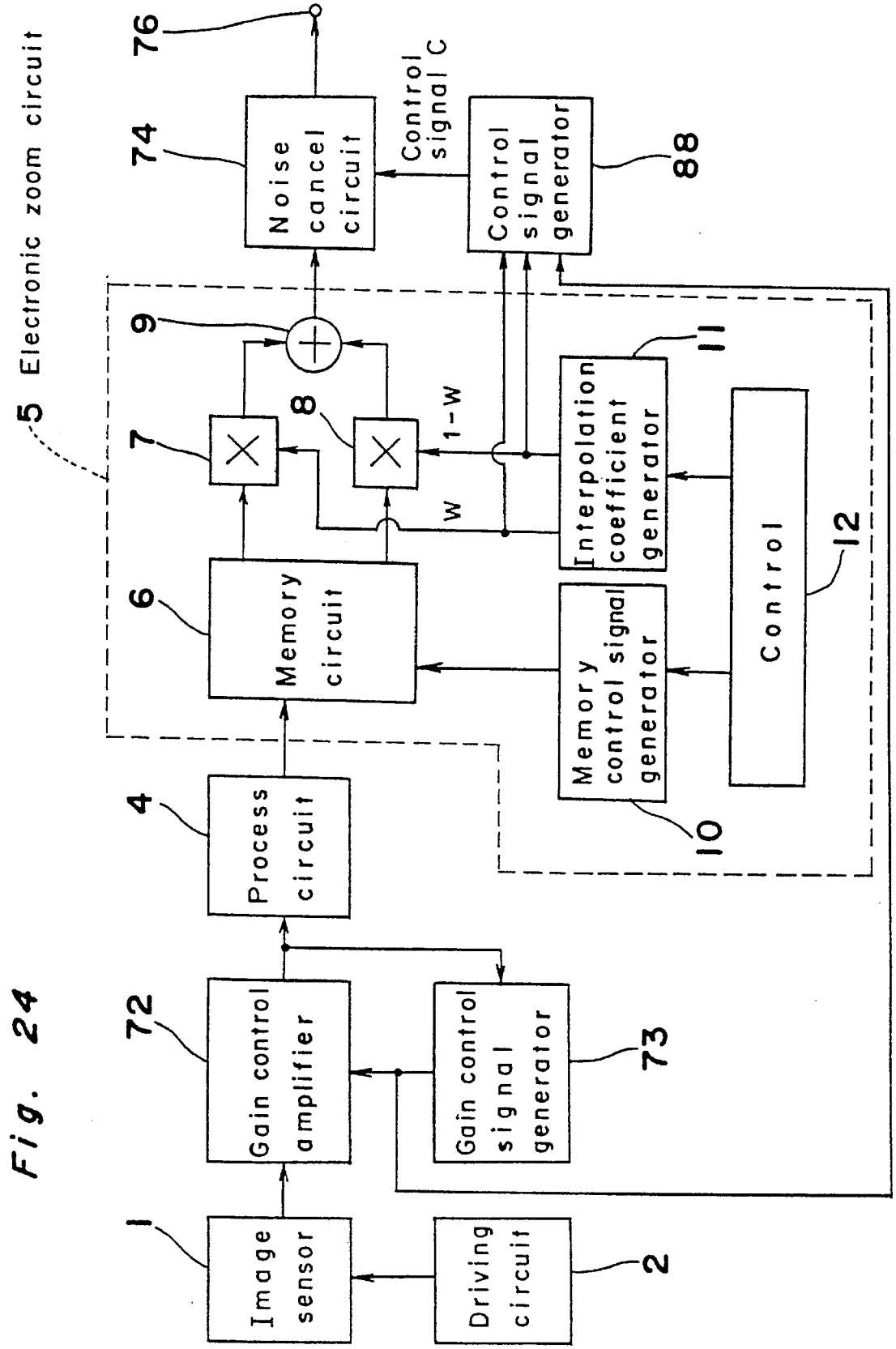
FIG. 24 is a block diagram showing a practical construction of the noise reduction circuit used in an embodiment of the fifth and sixth apparatus of the present invention.

FIG. 24 is a block diagram of an image pickup apparatus with electronic zoom function showing a second embodiment of the fifth apparatus of the present invention. Its difference from the first embodiment of FIG. 22 exists in that while in the first embodiment noise reduction characteristic of the noise reduction circuit 74 is controlled only by the interpolation weight coefficient w and (1−w) from the interpolation coefficient generator 11, the noise reduction characteristic of the noise reduction circuit 74 is instead controlled depending on both the interpolation weight coefficient w and (1−w) from the interpolation coefficient generator 11 and the amplification degree of the gain control amplifier 72. More specifically, a noise reduction control signal generator 88 forms a control signal C corresponding to both a signal for controlling the amplification degree of the gain control amplifier 72 from the gain control signal generator 73 and either of the interpolation weight coefficients w and (1−w) from the interpolation coefficient generator 11, whichever smaller. The greater the amplification degree of the gain control amplifier 72 is, or the smaller the coefficient of either of the interpolation weight coefficients w and (1−w) is, whichever smaller, the more the noise reduction circuit 74 is controlled so as to reduce noise. As a result, lines having greater amplification degree and having greater coefficients of the smaller one of the interpolation weight coefficients w and (1−w), i.e. lines having greater noise levels are reduced in noise to more extent, with the result of reduced differences in noise level between lines of an electronically zoomed image signal, as shown in FIG. 26, thus suppressing disturbing lateral stripes due to noise differences between lines as described for the prior art. With the above arrangement, it is possible to suppress disturbing lateral stripes which would become greatly noticeable especially when a dark object is picked up to require the gain of the gain control amplifier to be increased, and also possible to minimize such a secondary undesirable effect that resolution would be deteriorated due to noise reduction when the gain of the gain control amplifier is small such as to make the disturbing lateral stripes less noticeable. In addition, although in the above second embodiment shown in FIG. 24 the noise reduction characteristic is controlled depending on both the interpolation weight coefficients w and (1−w) and the amplification degree of the gain control amplifier 72, similar effect can be obtained also when the noise reduction characteristic of the noise reduction circuit 74 is controlled depending on only the amplification degree of the gain control amplifier 72.

Although the fifth and sixth apparatus of the present invention have been described above taking the case of an image pickup apparatus with electronic zoom function provided with image enlargement function, it is apparent that the present invention can generally be applied to image enlargement apparatus which electronically enlarge images without limiting to image pickup apparatus such as described above. For such wider application, it may be arranged that the image sensor 1 and the driving circuit 2 in FIG. 22 and FIG. 24 are omitted and the gain control amplifier 72 has direct input of an image signal led thereto, and that the process circuit 4 may also be omitted if unnecessary.

Further although the embodiments of the present invention have been described above taking the case in which memories are used as the electronic zoom circuits 5, 45, and 60, any electronic zoom circuit may be incorporated in the construction of the present invention without limiting to the electronic zoom circuits such as described above. For example, it is also possible to incorporate a simplified electronic zoom circuit in which line memories are combined with on/off control for vertical scan of the image sensor or control of read positions without using field memories.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A horizontal line interpolation circuit comprising:

a gain control amplifier connected to a signal processing circuit for amplifying and processing an input image signal;

an interpolation circuit for obtaining an output image signal by performing interpolation processing for horizontal lines of an output signal of the signal processing circuit; and a noise reduction circuit for reducing noise of the output image signal of the interpolation circuit in accordance with at least an amplification degree of the gain control amplifier.

2. A horizontal line interpolation circuit comprising:

a gain control amplifier connected to a signal processing circuit for amplifying and processing an input image signal;

an interpolation circuit for obtaining an output image signal by performing interpolation processing for horizontal lines of an output signal of the signal processing circuit; and a noise reduction circuit for reducing noise of the output image signal of the interpolation circuit in accordance with both an amplification degree of the gain control amplifier and an interpolation coefficient of the interpolation processing.

3. An image pickup apparatus comprising:

a gain control amplifier connected to a signal processing circuit for amplifying and processing an output signal of an image sensor;

an interpolation circuit for performing interpolation processing for horizontal lines of an output signal of the signal processing circuit; and a noise reduction circuit for reducing noise of an output signal of the interpolation circuit in accordance with at least an amplification degree of the gain control amplifier.

4. An image pickup apparatus comprising:

a gain control amplifier for amplifying an output signal of an image sensor;

a signal processing circuit for processing an output signal of the gain control amplifier;

an interpolation circuit for performing interpolation processing for horizontal lines of an output signal of the signal processing circuit; and a noise reduction circuit for reducing noise of the output signal of the interpolation circuit in accordance with both an amplification degree of the gain control amplifier and an interpolation coefficient of the interpolation processing.

* * * * *